(12) United States Patent
Wang

(10) Patent No.: US 6,512,969 B1
(45) Date of Patent: Jan. 28, 2003

(54) VEHICLE SENSING SYSTEM USING BIASED SEVERITY MEASURE

(75) Inventor: Jenne-Tai Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/935,874

(22) Filed: Aug. 23, 2001

(51) Int. Cl.$^7$ ............................................. B60R 21/32
(52) U.S. Cl. ........................... 701/45; 701/46; 340/438; 340/429; 340/436; 180/232; 180/271; 180/274
(58) Field of Search ...................... 701/45, 46; 340/438, 340/436, 429; 280/735; 180/232, 271, 268, 274, 273, 282; 70/45

(56) References Cited

U.S. PATENT DOCUMENTS

| | | | |
|---|---|---|---|
| 3,097,354 A | 7/1963 | Blowney et al. | 343/6.5 |
| 4,714,925 A | 12/1987 | Bartlett | 340/825.55 |
| 5,317,309 A | 5/1994 | Vercellotti et al. | 340/825.54 |
| 5,508,920 A | 4/1996 | Gioutsos et al. | 364/424.05 |
| 5,540,461 A | 7/1996 | Nitschke et al. | 280/735 |
| 5,546,311 A | 8/1996 | Sekine | 364/449 |
| 5,563,589 A | 10/1996 | Blaimont et al. | 340/933 |
| 5,684,474 A | 11/1997 | Gilon et al. | 340/903 |
| 5,748,477 A | 5/1998 | Katoh | 364/461 |
| 5,785,347 A | 7/1998 | Adolph et al. | 280/735 |
| 5,787,377 A | 7/1998 | Watanabe et al. | 701/45 |
| 5,835,007 A | 11/1998 | Kosiak | 340/436 |
| 5,841,367 A | 11/1998 | Giovanni | 340/903 |
| 5,845,000 A | 12/1998 | Breed et al. | 382/100 |
| 5,964,817 A | 10/1999 | Dalum et al. | 701/45 |
| 5,999,871 A | 12/1999 | Liu | 701/45 |
| 6,012,008 A | 1/2000 | Scully | 701/45 |
| 6,036,225 A * | 3/2000 | Foo et al. | 280/735 |
| 6,078,854 A * | 6/2000 | Breed et al. | 701/49 |
| 6,199,903 B1 * | 3/2001 | Brambilla et al. | 280/735 |
| 6,212,454 B1 * | 4/2001 | Foo et al. | 701/45 |
| 6,305,709 B1 * | 10/2001 | Okada | 280/735 |

* cited by examiner

Primary Examiner—William A. Cuchlinski, Jr.
Assistant Examiner—Tuan C To
(74) Attorney, Agent, or Firm—Kathryn A. Marra

(57) ABSTRACT

A sensing algorithm for a dual stage airbag system is disclosed which applies a biased severity measure BSM to determine no-deployment, single-stage deployment or two-stage deployment of an airbag. A biased severity measure uses a bias factor to make a chosen severity measure in favor of the robustness or sensitivity of the algorithm, as desired. The sensing algorithm also employs a predicted occupant movement POM which must reach a preset occupant movement threshold before the biased severity measure is compared with first and second preset severity thresholds for determining actuation of the first and second stages of airbag actuation.

5 Claims, 14 Drawing Sheets

ThD= 66 mm
POM*q                                                q=       1 (all-fire)        1 (no-fire)

All-Fire Events

| Time | F8 | F7 | F6 | F5 | F41/2 | R2 | F21 | F31 | A3 | R4 | O3 | O21/2 | A2 | A6 | A11 |
|---|---|---|---|---|---|---|---|---|---|---|---|---|---|---|---|
| 6.3 | 86.5 | 91.2 | 66.5 | 56.4 | 55.7 | 37.2 | 55.8 | 50.5 | 35.0 | 38.3 | 38.9 | 41.9 | 36.1 | 34.9 | 37.9 |
| 7.5 | 104.2 | 104.3 | 77.8 | 72.9 | 73.2 | 53.3 | 60.2 | 49.7 | 39.1 | 18.6 | 34.7 | 39.4 | 40.3 | 28.7 | 32.7 |
| 8.8 | 86.9 | 105.2 | 85.6 | 77.8 | 84.4 | 31.7 | 79.3 | 67.0 | 44.2 | 33.4 | 42.2 | 46.8 | 38.0 | 40.8 | 41.3 |
| 10.0 | 97.6 | 89.6 | 95.0 | 83.1 | 99.6 | 60.1 | 80.8 | 64.6 | 50.0 | 40.9 | 32.3 | 44.8 | 41.6 | 31.0 | 36.5 |
| 11.3 | 82.8 | 98.1 | 74.6 | 83.2 | 90.2 | 70.8 | 103.9 | 80.9 | 51.3 | 56.3 | 49.4 | 42.9 | 48.4 | 42.6 | 48.1 |
| 12.5 | 112.9 | 89.0 | 84.5 | 78.7 | 91.4 | 85.0 | 93.0 | 65.2 | 69.1 | 60.2 | 54.6 | 41.0 | 48.3 | 40.9 | 46.9 |
| 13.8 | 110.8 | 111.3 | 83.7 | 82.6 | 78.6 | 91.1 | 108.3 | 83.7 | 75.1 | 74.1 | 62.0 | 47.8 | 52.2 | 37.0 | 56.7 |
| 15.0 | 160.5 | 95.7 | 91.6 | 83.3 | 84.9 | 110.1 | 100.4 | 70.9 | 83.9 | 68.0 | 65.4 | 43.4 | 65.2 | 57.5 | 58.3 |
| 16.3 | 165.2 | 133.4 | 83.0 | 87.0 | 70.5 | 112.3 | 108.0 | 94.1 | 85.2 | 65.4 | 69.8 | 55.0 | 67.5 | 52.8 | 67.6 |
| 17.5 | 186.5 | 132.7 | 121.0 | 93.2 | 95.3 | 101.2 | 89.4 | 84.6 | 95.0 | 62.2 | 64.1 | 48.3 | 70.0 | 64.5 | 62.1 |
| 18.8 | 197.1 | 147.4 | 115.3 | 113.7 | 107.0 | 92.0 | 112.5 | 102.4 | 98.6 | 73.6 | 73.7 | 56.9 | 80.8 | 68.7 | 71.7 |
| 20.0 | 213.7 | 136.2 | 127.8 | 114.3 | 116.5 | 101.6 | 102.4 | 101.0 | 102.9 | 62.0 | 78.8 | 60.8 | 86.8 | 82.1 | 69.2 |
| 21.3 | 187.9 | 180.0 | 126.2 | 126.3 | 114.0 | 112.6 | 118.2 | 109.0 | 101.2 | 52.6 | 90.1 | 75.0 | 90.0 | 50.5 | 77.8 |
| 22.5 | 193.9 | 179.9 | 139.0 | 141.2 | 128.1 | 121.9 | 122.4 | 109.0 | 101.2 | 70.8 | 102.2 | 79.6 | 95.4 | 67.7 | 79.8 |
| 23.8 | 177.6 | 188.1 | 140.8 | 141.6 | 130.4 | 134.1 | 136.9 | 109.0 | 104.8 | 64.0 | 109.4 | 98.3 | 105.8 | 59.1 | 89.1 |
| 25.0 | 194.8 | 197.8 | 148.8 | 145.7 | 126.6 | 150.9 | 144.0 | 118.2 | 101.7 | 77.3 | 112.2 | 97.6 | 109.7 | 59.0 | 91.9 |
| 26.3 | 201.7 | 203.9 | 157.0 | 161.6 | 151.6 | 144.4 | 153.7 | 124.2 | 117.6 | 73.2 | 115.0 | 103.2 | 113.2 | 63.9 | 102.5 |
| 27.5 | 231.1 | 202.4 | 178.0 | 176.2 | 160.6 | 136.2 | 161.1 | 134.5 | 120.3 | 93.8 | 117.7 | 99.8 | 121.3 | 84.0 | 104.9 |
| 28.8 | 237.1 | 213.7 | 194.8 | 188.0 | 177.3 | 144.4 | 163.7 | 139.9 | 134.5 | 85.4 | 124.5 | 106.9 | 125.3 | 89.5 | 109.3 |
| 30.0 | 270.5 | 224.8 | 222.0 | 204.5 | 182.9 | 146.8 | 168.5 | 158.3 | 135.6 | 103.5 | 129.0 | 107.9 | 132.5 | 92.5 | 115.5 |
| 31.3 | 267.3 | 222.6 | 222.5 | 219.8 | 200.6 | 163.6 | 167.8 | 164.2 | 142.3 | 96.4 | 137.2 | 118.0 | 136.5 | 104.5 | 124.5 |
| 32.5 | 272.8 | 256.4 | 230.8 | 226.7 | 200.0 | 167.9 | 178.0 | 173.0 | 145.1 | 113.8 | 140.6 | 121.2 | 140.1 | 112.6 | 133.1 |
| 33.8 | 269.2 | 266.3 | 229.9 | 234.6 | 214.3 | 190.7 | 180.8 | 181.5 | 154.7 | 121.8 | 150.2 | 133.8 | 145.2 | 111.7 | 133.7 |
| 35.0 | 303.8 | 276.4 | 242.6 | 235.1 | 220.5 | 201.0 | 191.6 | 190.3 | 154.8 | 140.3 | 147.1 | 138.3 | 148.8 | 131.1 | 148.1 |
| 36.3 | 295.2 | 285.0 | 235.5 | 250.2 | 233.3 | 237.7 | 198.1 | 197.7 | 168.4 | 145.9 | 161.4 | 148.5 | 156.9 | 135.6 | 147.9 |
| 37.5 | 323.4 | 314.7 | 260.9 | 247.3 | 238.2 | 235.6 | 206.6 | 202.1 | 179.0 | 143.8 | 162.2 | 155.5 | 155.9 | 155.5 | 159.3 |
| 38.8 | 376.1 | 324.4 | 273.9 | 264.9 | 243.5 | 241.2 | 215.7 | 217.5 | 185.7 | 150.2 | 181.3 | 163.1 | 175.1 | 168.0 | 155.1 |
| 40.0 | 414.3 | 332.8 | 287.3 | 267.8 | 246.4 | 245.6 | 223.5 | 225.3 | 196.8 | 139.9 | 184.4 | 169.6 | 172.1 | 191.9 | 166.1 |
| 41.3 | 380.5 | 358.3 | 294.7 | 285.6 | 245.8 | 235.3 | 235.2 | 238.5 | 211.2 | 134.2 | 199.1 | 178.0 | 186.4 | 198.4 | 164.4 |
| 42.5 | 424.5 | 385.7 | 301.5 | 288.7 | 253.7 | 222.9 | 248.6 | 249.0 | 219.5 | 137.0 | 205.0 | 184.2 | 189.0 | 208.8 | 176.1 |
| 43.8 | 414.5 | 400.0 | 315.4 | 309.5 | 269.7 | 266.3 | 260.4 | 257.0 | 231.7 | 160.9 | 212.8 | 194.0 | 199.1 | 200.8 | 174.9 |
| 45.0 | 423.3 | 414.3 | 331.0 | 314.7 | 285.4 | 317.2 | 273.8 | 264.3 | 256.5 | 183.7 | 212.3 | 202.2 | 199.2 | 207.7 | 187.9 |
| 46.3 | 413.5 | 414.9 | 342.9 | 335.0 | 299.4 | 345.0 | 286.3 | 277.0 | 275.7 | 206.0 | 219.6 | 208.7 | 211.5 | 208.2 | 186.9 |
| 47.5 | 483.6 | 448.0 | 362.0 | 347.7 | 320.5 | 399.3 | 298.2 | 286.4 | 259.8 | 233.4 | 222.3 | 219.1 | 218.9 | 216.0 | 194.7 |
| 48.8 | 496.6 | 495.3 | 362.7 | 361.7 | 335.6 | 429.0 | 310.5 | 298.9 | 274.0 | 245.8 | 220.9 | 225.1 | 226.8 | 228.3 | 197.0 |
| 50.0 | 537.2 | 498.8 | 386.0 | 374.2 | 344.1 | 435.2 | 321.8 | 314.7 | 287.9 | 251.0 | 237.9 | 237.6 | 242.3 | 244.8 | 207.0 |

All-fire and no-fire events of a given vehicle: Normal Case - Time vs. POM, Thd = 66mm

| All-Fire Events | | | | | | | | | | No-Fire Events | | | | | | |
|---|---|---|---|---|---|---|---|---|---|---|---|---|---|---|---|---|
| P3 | A5 | O11 | P4 | E2 | P2 | O41/2 | O5 | A41 | P11/2 | F1 | E1 | E3 | E4 | E5 | R1 | R3 |
| 40.1 | 32.4 | 34.2 | 32.3 | 20.5 | 24.0 | 39.2 | 38.7 | 25.1 | 27.8 | 26.2 | 14.8 | -8.8 | 19.3 | -6.6 | 21.9 | 20.6 |
| 33.5 | 22.1 | 32.0 | 12.3 | 17.9 | 19.5 | 42.7 | 43.5 | 28.7 | 23.4 | 33.2 | 13.8 | -78.4 | 21.6 | 2.0 | 21.4 | 19.8 |
| 31.3 | 34.7 | 37.6 | 23.3 | 18.3 | 5.0 | 26.4 | 45.7 | 22.0 | 22.6 | 37.2 | 17.1 | -40.4 | 23.1 | 1.6 | 23.1 | 22.9 |
| 23.4 | 33.7 | 39.7 | 8.1 | 16.9 | 19.3 | 39.7 | 44.5 | 30.7 | 22.4 | 44.0 | 14.8 | -61.5 | 28.5 | 13.8 | 27.2 | 23.5 |
| 32.4 | 54.4 | 44.1 | 22.7 | 21.5 | 18.9 | 29.3 | 43.9 | 32.3 | 23.3 | 48.9 | 13.4 | -34.0 | 32.4 | 13.7 | 25.7 | 27.5 |
| 31.1 | 51.5 | 40.0 | 15.8 | 26.7 | 24.2 | 38.8 | 41.0 | 45.2 | 19.0 | 55.9 | 8.2 | -21.9 | 27.9 | 16.8 | 30.6 | 32.6 |
| 35.3 | 53.6 | 42.3 | 40.6 | 31.7 | 36.8 | 40.9 | 43.2 | 51.4 | 23.7 | 67.8 | 5.5 | 38.7 | 26.7 | 17.7 | 29.8 | 39.2 |
| 48.6 | 39.7 | 44.1 | 27.4 | 29.9 | 39.9 | 46.8 | 55.4 | 57.6 | 28.2 | 73.2 | 5.7 | -2.4 | 38.9 | 26.4 | 36.2 | 37.5 |
| 59.5 | 39.8 | 49.0 | 45.3 | 36.7 | 37.6 | 46.1 | 46.5 | 53.6 | 25.8 | 83.5 | 8.0 | 23.5 | 31.0 | 21.5 | 39.6 | 50.0 |
| 57.4 | 26.2 | 44.9 | 40.1 | 33.9 | 42.0 | 46.1 | 57.1 | 54.5 | 28.9 | 87.9 | 14.8 | -4.7 | 35.1 | 20.8 | 40.5 | 43.2 |
| 60.2 | 43.8 | 52.2 | 47.6 | 36.3 | 43.7 | 46.4 | 52.9 | 44.3 | 32.9 | 87.9 | 15.8 | 11.4 | 32.5 | 31.9 | 37.2 | 48.4 |
| 62.0 | 56.8 | 58.1 | 43.8 | 39.8 | 38.7 | 53.7 | 73.2 | 42.1 | 35.8 | 86.8 | 19.1 | -6.6 | 34.1 | 41.9 | 40.5 | 41.9 |
| 59.4 | 62.5 | 61.0 | 52.9 | 50.1 | 50.6 | 64.5 | 62.5 | 46.2 | 39.7 | 80.4 | 16.6 | 0.7 | 27.8 | 40.7 | 35.3 | 57.6 |
| 55.7 | 62.1 | 61.4 | 54.5 | 48.2 | 57.8 | 69.0 | 79.1 | 54.6 | 44.2 | 91.2 | 17.0 | -4.2 | 34.0 | 50.8 | 31.6 | 56.1 |
| 59.9 | 77.3 | 72.3 | 61.1 | 56.8 | 53.8 | 77.7 | 74.4 | 65.0 | 46.5 | 89.1 | 14.0 | 1.9 | 29.2 | 62.7 | 33.0 | 68.2 |
| 66.9 | 69.4 | 78.1 | 61.9 | 60.5 | 41.3 | 82.4 | 75.6 | 76.5 | 46.8 | 111.4 | 17.9 | -0.9 | 34.5 | 64.9 | 34.2 | 60.5 |
| 74.5 | 75.0 | 85.6 | 62.0 | 66.6 | 56.1 | 89.3 | 75.3 | 82.4 | 45.8 | 115.6 | 21.2 | -0.4 | 31.2 | 65.6 | 40.8 | 70.5 |
| 62.4 | 76.5 | 86.4 | 67.8 | 82.3 | 65.2 | 88.3 | 80.8 | 81.8 | 48.7 | 140.0 | 24.0 | -0.4 | 28.7 | 70.3 | 45.7 | 57.0 |
| 77.7 | 94.3 | 91.9 | 68.5 | 86.4 | 65.3 | 91.9 | 86.9 | 79.5 | 59.3 | 136.1 | 28.1 | -1.2 | 27.5 | 66.0 | 48.6 | 57.4 |
| 71.6 | 108.5 | 93.6 | 84.3 | 96.7 | 59.9 | 95.5 | 93.2 | 80.0 | 64.6 | 145.3 | 28.2 | -4.3 | 29.0 | 67.3 | 51.4 | 58.2 |
| 72.0 | 120.0 | 100.6 | 83.1 | 94.1 | 80.5 | 95.5 | 109.5 | 85.6 | 69.4 | 133.0 | 29.7 | -4.0 | 29.1 | 69.8 | 56.6 | 70.3 |
| 68.1 | 120.9 | 101.6 | 94.9 | 89.9 | 86.7 | 100.4 | 104.9 | 98.1 | 73.9 | 143.3 | 28.8 | -5.4 | 27.4 | 70.3 | 55.5 | 74.6 |
| 95.0 | 133.6 | 105.6 | 85.0 | 85.0 | 73.7 | 108.2 | 124.1 | 110.5 | 78.4 | 134.9 | 31.8 | -1.7 | 31.3 | 72.2 | 58.0 | 85.7 |
| 88.1 | 144.4 | 116.8 | 105.8 | 85.1 | 79.7 | 122.7 | 121.6 | 113.2 | 71.2 | 145.8 | 33.9 | -4.7 | 32.5 | 73.8 | 60.4 | 91.9 |
| 120.5 | 144.1 | 121.1 | 96.9 | 95.6 | 88.9 | 136.2 | 137.3 | 127.2 | 71.4 | 147.2 | 40.9 | -4.2 | 34.8 | 73.2 | 65.0 | 93.5 |
| 135.5 | 146.3 | 124.4 | 111.9 | 112.7 | 86.5 | 140.6 | 130.1 | 125.7 | 76.1 | 157.5 | 45.7 | -4.5 | 34.5 | 69.1 | 66.6 | 88.7 |
| 158.2 | 152.0 | 129.6 | 107.0 | 114.0 | 89.4 | 149.8 | 126.0 | 130.1 | 67.9 | 159.7 | 52.0 | -3.3 | 37.9 | 67.7 | 70.7 | 87.7 |
| 162.5 | 167.2 | 140.7 | 127.8 | 130.4 | 101.1 | 145.2 | 130.4 | 125.8 | 66.0 | 169.2 | 56.5 | -6.3 | 39.2 | 64.1 | 74.1 | 92.3 |
| 180.1 | 164.0 | 143.8 | 132.6 | 132.1 | 108.9 | 150.8 | 129.5 | 135.2 | 82.2 | 173.5 | 59.6 | -3.4 | 41.9 | 66.7 | 78.8 | 95.2 |
| 174.9 | 180.0 | 152.5 | 139.9 | 146.5 | 118.9 | 145.5 | 126.4 | 130.0 | 86.7 | 183.5 | 68.8 | -6.4 | 42.2 | 66.8 | 82.7 | 104.0 |
| 191.8 | 197.3 | 158.7 | 145.7 | 144.2 | 138.0 | 161.2 | 136.5 | 140.6 | 94.7 | 190.5 | 69.4 | -6.3 | 45.9 | 67.9 | 86.6 | 110.6 |
| 192.6 | 208.6 | 169.2 | 144.5 | 172.0 | 170.3 | 161.2 | 155.6 | 144.1 | 106.7 | 198.8 | 71.3 | -7.9 | 48.0 | 70.1 | 91.7 | 115.4 |
| 189.9 | 218.6 | 174.7 | 151.8 | 174.1 | 190.0 | 172.3 | 153.1 | 143.8 | 116.1 | 207.1 | 65.0 | -6.8 | 52.0 | 73.9 | 94.9 | 113.6 |
| 225.0 | 231.5 | 181.8 | 164.0 | 205.1 | 192.4 | 176.5 | 161.1 | 145.5 | 114.5 | 215.5 | 55.4 | -7.8 | 51.6 | 76.2 | 101.4 | 117.8 |
| 242.4 | 230.0 | 190.4 | 159.9 | -114.9 | 215.7 | 183.5 | 160.9 | 168.7 | 119.5 | 225.1 | 54.7 | -6.2 | 54.1 | 73.7 | 107.0 | 116.0 |
| 253.1 | 233.4 | 199.4 | 180.5 | -119.4 | 203.1 | 183.0 | 171.0 | 169.3 | 124.3 | 233.6 | 50.8 | -6.7 | 54.5 | 77.6 | 114.3 | 124.1 |

FIG. 4B

ThD = 66 mm; ThS1 = 0.14 m/s; ThS2 = 0.60 m/s
(Vr)max = (Vrad*q-VradF1*k)max    k= 1.15    q= 1 (all-fire)    1 (no-fire)

| Time | F8 | F7 | F6 | F5 | F41/2 | R2 | F21 | F31 | A3 | R4 | O3 | O21/2 | A2 | A6 | A11 |
|---|---|---|---|---|---|---|---|---|---|---|---|---|---|---|---|
| | | | | | | | | | | | | All-Fire Events | | | |
| 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 1.25 | 0.33 | 0.21 | 0.00 | 0.16 | 0.10 | 0.60 | 0.00 | 0.00 | 0.13 | 0.35 | 0.60 | 0.60 | 0.09 | 0.21 | 0.16 |
| 2.50 | 0.99 | 0.77 | 0.18 | 0.46 | 0.29 | 1.02 | 0.09 | 0.22 | 0.64 | 1.01 | 0.86 | 0.98 | 0.34 | 0.33 | 0.39 |
| 3.75 | 1.18 | 1.25 | 0.53 | 0.95 | 0.46 | 1.02 | 0.33 | 0.22 | 0.64 | 1.01 | 0.86 | 0.98 | 0.34 | 0.33 | 0.39 |
| 5.00 | 1.23 | 1.25 | 0.79 | 0.95 | 0.53 | 1.02 | 0.33 | 0.22 | 0.64 | 1.01 | 0.86 | 0.98 | 0.34 | 0.33 | 0.39 |
| 6.25 | 1.23 | 1.32 | 0.79 | 0.95 | 0.53 | 1.02 | 0.33 | 0.29 | 0.64 | 1.01 | 0.86 | 0.98 | 0.34 | 0.33 | 0.39 |
| 7.50 | 1.23 | 1.32 | 0.79 | 0.95 | 0.53 | 1.02 | 0.33 | 0.29 | 0.64 | 1.01 | 0.86 | 0.98 | 0.34 | 0.33 | 0.39 |
| 8.75 | 1.23 | 1.32 | 0.79 | 0.95 | 0.53 | 1.02 | 0.33 | 0.29 | 0.90 | 1.01 | 0.86 | 0.98 | 0.34 | 0.33 | 0.39 |
| 10.00 | 1.23 | 1.32 | 0.79 | 0.99 | 1.10 | 1.02 | 0.33 | 0.33 | 0.90 | 1.01 | 0.86 | 0.98 | 0.34 | 0.67 | 0.39 |
| 11.25 | 1.23 | 1.32 | 0.79 | 0.99 | 1.10 | 1.02 | 0.33 | 0.33 | 0.90 | 1.01 | 0.86 | 0.98 | 0.34 | 0.67 | 0.39 |
| 12.50 | 1.34 | 1.39 | 0.79 | 0.99 | 1.10 | 1.02 | 0.33 | 0.33 | 0.90 | 1.01 | 0.86 | 0.98 | 0.46 | 0.67 | 0.39 |
| 13.75 | 1.64 | 1.86 | 0.79 | 0.99 | 1.10 | 1.02 | 0.33 | 0.33 | 0.90 | 1.01 | 0.86 | 0.98 | 0.46 | 0.67 | 0.39 |
| 15.00 | 2.06 | 2.17 | 0.79 | 0.99 | 1.10 | 1.02 | 0.33 | 0.33 | 0.90 | 1.01 | 0.86 | 0.98 | 0.46 | 0.67 | 0.39 |
| 16.25 | 2.06 | 3.03 | 0.79 | 0.99 | 1.10 | 1.13 | 0.33 | 0.33 | 0.90 | 1.01 | 0.86 | 0.98 | 0.46 | 1.24 | 0.39 |
| 17.50 | 2.06 | 3.33 | 0.79 | 1.05 | 1.10 | 1.43 | 0.33 | 0.33 | 0.90 | 1.01 | 0.86 | 0.98 | 0.46 | 1.24 | 0.39 |
| 18.75 | 2.06 | 3.34 | 0.79 | 1.66 | 1.10 | 2.04 | 0.33 | 0.33 | 0.90 | 1.01 | 0.86 | 0.98 | 0.70 | 1.24 | 0.39 |
| 20.00 | 2.06 | 3.34 | 0.79 | 1.71 | 1.10 | 2.39 | 0.43 | 0.33 | 0.90 | 1.01 | 0.86 | 0.98 | 0.70 | 1.24 | 0.39 |
| 21.25 | 2.06 | 3.34 | 0.79 | 1.71 | 1.10 | 2.97 | 0.43 | 0.33 | 1.27 | 1.01 | 0.86 | 0.98 | 0.89 | 1.57 | 0.39 |
| 22.50 | 2.06 | 3.34 | 0.79 | 1.92 | 1.10 | 3.49 | 0.43 | 0.95 | 2.03 | 1.26 | 0.86 | 0.98 | 1.68 | 1.57 | 0.39 |
| 23.75 | 2.06 | 3.34 | 0.79 | 1.97 | 1.10 | 3.49 | 0.43 | 0.95 | 2.03 | 1.26 | 0.86 | 0.98 | 1.72 | 1.57 | 0.39 |
| 25.00 | 2.06 | 3.34 | 0.79 | 2.27 | 1.10 | 3.49 | 0.43 | 0.95 | 2.27 | 1.26 | 0.86 | 0.98 | 2.14 | 1.57 | 0.39 |
| 26.25 | 2.06 | 3.34 | 0.79 | 2.54 | 1.25 | 3.49 | 0.50 | 0.95 | 3.15 | 1.26 | 0.86 | 0.98 | 2.15 | 1.57 | 0.39 |
| 27.50 | 2.06 | 3.34 | 0.79 | 2.82 | 1.25 | 3.49 | 0.50 | 0.95 | 3.15 | 1.26 | 0.86 | 0.98 | 2.15 | 1.57 | 0.39 |
| 28.75 | 2.06 | 3.34 | 0.79 | 3.19 | 1.25 | 3.49 | 0.50 | 0.95 | 3.15 | 1.26 | 1.07 | 0.98 | 2.15 | 1.57 | 0.39 |
| 30.00 | 2.06 | 3.34 | 0.79 | 3.19 | 1.25 | 3.49 | 0.50 | 0.95 | 3.15 | 1.26 | 1.07 | 0.98 | 2.15 | 1.57 | 0.39 |
| 31.25 | 2.06 | 3.34 | 0.79 | 3.19 | 1.67 | 3.49 | 0.50 | 1.34 | 3.25 | 1.26 | 1.07 | 0.98 | 2.15 | 1.57 | 0.39 |
| 32.50 | 2.06 | 3.34 | 0.79 | 3.19 | 1.69 | 3.49 | 0.50 | 2.30 | 3.84 | 1.26 | 1.07 | 0.98 | 2.24 | 1.57 | 0.72 |
| 33.75 | 2.06 | 3.34 | 0.79 | 3.19 | 1.69 | 3.49 | 0.50 | 2.30 | 3.93 | 1.26 | 1.07 | 0.98 | 2.24 | 1.57 | 1.19 |
| 35.00 | 2.06 | 3.34 | 0.79 | 3.19 | 1.69 | 3.49 | 0.50 | 2.30 | 4.68 | 1.26 | 1.07 | 0.98 | 2.77 | 1.57 | 1.96 |
| 36.25 | 2.06 | 3.34 | 0.79 | 3.19 | 1.69 | 3.49 | 0.50 | 2.30 | 4.68 | 1.26 | 1.07 | 0.98 | 2.77 | 1.57 | 1.96 |
| 37.50 | 2.06 | 3.34 | 0.79 | 3.19 | 1.69 | 3.49 | 0.50 | 2.30 | 4.68 | 1.26 | 1.07 | 0.98 | 2.77 | 1.57 | 1.96 |
| 38.75 | 2.06 | 3.34 | 0.79 | 3.19 | 1.69 | 3.49 | 0.79 | 2.30 | 4.68 | 1.26 | 1.07 | 0.98 | 2.77 | 1.57 | 1.96 |
| 40.00 | 2.06 | 3.34 | 0.79 | 3.19 | 1.69 | 3.49 | 0.94 | 2.30 | 4.68 | 1.26 | 1.07 | 0.98 | 2.77 | 1.57 | 1.96 |
| 41.25 | 2.16 | 3.34 | 0.79 | 3.19 | 1.69 | 3.49 | 1.17 | 2.30 | 4.68 | 1.26 | 1.62 | 0.98 | 2.77 | 1.57 | 1.96 |
| 42.50 | 2.16 | 3.34 | 0.79 | 3.19 | 1.69 | 3.49 | 1.17 | 2.30 | 4.68 | 1.26 | 1.73 | 0.98 | 2.77 | 1.57 | 1.96 |
| 43.75 | 2.16 | 3.34 | 0.79 | 3.19 | 1.69 | 3.49 | 1.17 | 2.30 | 4.68 | 1.26 | 2.32 | 0.98 | 2.77 | 1.57 | 1.96 |
| 45.00 | 2.16 | 3.34 | 0.79 | 3.19 | 1.69 | 3.49 | 1.17 | 2.30 | 4.68 | 1.26 | 2.60 | 0.98 | 2.77 | 1.57 | 1.96 |
| 46.25 | 2.16 | 3.34 | 0.79 | 3.19 | 1.69 | 3.49 | 1.17 | 2.30 | 4.68 | 1.26 | 2.61 | 0.98 | 2.77 | 1.79 | 1.96 |
| 47.50 | 2.16 | 3.34 | 0.79 | 3.19 | 1.69 | 3.49 | 1.17 | 2.30 | 4.68 | 1.26 | 2.61 | 0.98 | 2.77 | 1.79 | 1.96 |
| 48.75 | 2.16 | 3.34 | 0.79 | 3.19 | 1.69 | 3.49 | 1.17 | 2.30 | 4.68 | 1.26 | 2.61 | 0.98 | 2.77 | 1.79 | 1.96 |
| 50.00 | 2.16 | 3.34 | 0.79 | 3.19 | 1.69 | 3.49 | 1.17 | 2.30 | 4.68 | 1.26 | 2.61 | 0.98 | 2.77 | 1.98 | 1.96 |
| Results | 8/8 | 8/8 | 8/8 | 9/9 | 9/10 | 13/13 | 10/0 | 11/0 | 14/14 | 15/15 | 19/19 | 23/23 | 18/19 | 20/20 | 19/0 |
| Required | 10/15 | 11/16 | 16/21 | 18/23 | 19/24 | 20/25 | 21/0 | 21/0 | 24/29 | 24/29 | 25/30 | 28/33 | 28/33 | 28/33 | 30/0 |

All-fire and no-fire events fo a given vehicle: Norminal Case - Time vs. BSM,
ThS1 = 0.14 m/s, ThS2 = 0.6 m/s

| All-Fire Events | | | | | | | | | | No-Fire Events | | | | | | |
|---|---|---|---|---|---|---|---|---|---|---|---|---|---|---|---|---|
| P3 | A5 | O11 | P4 | E2 | P2 | O41/2 | O5 | A41 | P11/2 | F1 | E1 | E3 | E4 | E5 | R1 | R3 |
| 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.15 | 0.26 | 0.02 | 0.60 | 0.53 | 0.00 | 0.00 | 0.13 | 0.05 | 0.00 | 0.03 | 0.00 | 0.60 | 0.02 | 0.11 | 0.00 |
| 0.29 | 0.25 | 0.50 | 0.34 | 1.25 | 0.87 | 0.06 | 0.00 | 0.13 | 0.70 | 0.00 | 0.03 | 0.54 | 1.26 | 0.06 | 0.11 | 0.00 |
| 0.81 | 0.34 | 0.50 | 0.52 | 1.79 | 0.87 | 0.32 | 0.00 | 0.13 | 0.70 | 0.00 | 0.03 | 0.54 | 1.75 | 0.06 | 0.11 | 0.00 |
| 0.81 | 0.34 | 0.50 | 0.52 | 2.06 | 0.87 | 0.44 | 0.00 | 0.13 | 0.70 | 0.00 | 0.03 | 0.54 | 1.75 | 0.06 | 0.11 | 0.00 |
| 0.81 | 0.34 | 0.50 | 0.52 | 2.69 | 0.87 | 0.44 | 0.16 | 0.13 | 0.70 | 0.00 | 0.03 | 0.54 | 1.75 | 0.06 | 0.11 | 0.00 |
| 0.81 | 0.34 | 0.50 | 0.52 | 2.72 | 0.87 | 0.44 | 0.56 | 0.13 | 0.70 | 0.00 | 0.03 | 0.54 | 2.03 | 0.06 | 0.11 | 0.00 |
| 0.81 | 0.34 | 0.50 | 0.52 | 2.72 | 0.87 | 0.44 | 0.56 | 0.13 | 0.70 | 0.00 | 0.03 | 0.54 | 2.17 | 0.06 | 0.11 | 0.00 |
| 0.81 | 0.34 | 0.50 | 0.52 | 2.72 | 0.87 | 0.44 | 0.56 | 0.13 | 0.70 | 0.00 | 0.03 | 0.54 | 2.17 | 0.06 | 0.11 | 0.00 |
| 0.81 | 0.34 | 0.50 | 0.52 | 2.72 | 0.87 | 0.44 | 0.56 | 0.13 | 0.70 | 0.00 | 0.03 | 0.54 | 2.17 | 0.06 | 0.11 | 0.00 |
| 0.81 | 0.34 | 0.50 | 0.52 | 2.72 | 0.87 | 0.44 | 0.56 | 0.13 | 0.70 | 0.00 | 0.03 | 0.54 | 2.17 | 0.06 | 0.11 | 0.00 |
| 0.92 | 0.36 | 0.50 | 0.52 | 2.72 | 0.87 | 0.44 | 0.56 | 0.13 | 0.70 | 0.00 | 0.03 | 0.54 | 2.17 | 0.06 | 0.11 | 0.00 |
| 0.92 | 0.36 | 0.50 | 0.52 | 2.72 | 1.11 | 0.44 | 0.56 | 0.13 | 0.70 | 0.00 | 0.03 | 0.54 | 2.17 | 0.06 | 0.11 | 0.00 |
| 1.33 | 0.36 | 0.50 | 0.61 | 2.72 | 1.97 | 0.49 | 0.56 | 0.13 | 0.70 | 0.00 | 0.03 | 0.54 | 2.17 | 0.06 | 0.11 | 0.00 |
| 1.33 | 0.36 | 0.50 | 0.61 | 2.72 | 2.18 | 0.49 | 0.56 | 0.13 | 0.70 | 0.00 | 0.03 | 0.54 | 2.17 | 0.06 | 0.11 | 0.00 |
| 1.33 | 0.65 | 0.50 | 0.61 | 2.72 | 2.71 | 0.49 | 0.56 | 0.13 | 0.70 | 0.00 | 0.03 | 0.54 | 2.17 | 0.06 | 0.11 | 0.00 |
| 1.33 | 0.65 | 0.50 | 1.05 | 2.72 | 2.71 | 0.49 | 0.56 | 0.13 | 0.70 | 0.00 | 0.03 | 0.54 | 2.17 | 0.06 | 0.11 | 0.00 |
| 1.33 | 0.65 | 0.50 | 1.64 | 2.72 | 2.71 | 0.77 | 0.56 | 0.13 | 0.70 | 0.00 | 0.03 | 0.54 | 2.17 | 0.06 | 0.11 | 0.00 |
| 1.33 | 0.65 | 0.50 | 2.27 | 2.72 | 2.89 | 0.77 | 0.56 | 0.13 | 1.45 | 0.00 | 0.03 | 0.54 | 2.17 | 0.06 | 0.11 | 0.00 |
| 1.33 | 0.65 | 0.50 | 2.27 | 2.72 | 2.89 | 0.77 | 0.56 | 0.13 | 1.49 | 0.00 | 0.03 | 0.54 | 2.17 | 0.06 | 0.11 | 0.00 |
| 1.33 | 0.65 | 0.50 | 2.27 | 2.72 | 2.89 | 0.77 | 0.56 | 0.13 | 1.49 | 0.00 | 0.03 | 0.54 | 2.17 | 0.06 | 0.11 | 0.00 |
| 1.33 | 1.30 | 0.50 | 2.27 | 2.72 | 2.89 | 0.77 | 0.88 | 0.13 | 1.49 | 0.00 | 0.03 | 0.54 | 2.17 | 0.06 | 0.11 | 0.00 |
| 1.74 | 1.68 | 0.50 | 2.27 | 2.72 | 2.89 | 0.77 | 1.28 | 0.13 | 1.49 | 0.00 | 0.03 | 0.54 | 2.17 | 0.06 | 0.11 | 0.00 |
| 1.74 | 2.05 | 0.50 | 2.27 | 2.72 | 2.89 | 0.77 | 1.32 | 0.13 | 1.49 | 0.00 | 0.03 | 0.54 | 2.17 | 0.06 | 0.11 | 0.00 |
| 1.74 | 2.16 | 0.50 | 2.27 | 2.72 | 2.89 | 0.77 | 1.84 | 0.13 | 1.49 | 0.00 | 0.03 | 0.54 | 2.17 | 0.06 | 0.11 | 0.00 |
| 1.74 | 2.16 | 0.50 | 2.27 | 2.72 | 2.89 | 0.77 | 2.40 | 0.13 | 1.49 | 0.00 | 0.03 | 0.54 | 2.17 | 0.06 | 0.11 | 0.00 |
| 1.74 | 2.16 | 0.50 | 2.27 | 2.72 | 2.89 | 0.93 | 3.03 | 0.13 | 1.49 | 0.00 | 0.03 | 0.54 | 2.17 | 0.06 | 0.11 | 0.00 |
| 1.74 | 2.36 | 0.50 | 2.27 | 2.72 | 2.89 | 1.68 | 3.34 | 0.13 | 1.49 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.13 | 1.49 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.13 | 1.49 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.13 | 1.49 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.13 | 1.49 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.13 | 1.49 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.13 | 1.49 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.20 | 1.49 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.65 | 1.61 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.74 | 1.61 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.86 | 1.61 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.86 | 1.61 | 0.00 | 0.03 | 0.54 | 2.17 | 0.06 | 0.11 | 0.00 |
| 1.74 | 2.86 | 0.50 | 2.27 | 2.72 | 2.89 | 1.68 | 3.34 | 0.86 | 1.61 | 0.00 | 0.03 | 0.54 | 2.17 | 0.06 | 0.11 | 0.00 |
| 27/27 | 25/25 | 25/0 | 29/29 | 28/28 | 33/33 | 24/24 | 23/26 | 44/0 | 33/33 | nd | nd | nd | nd | nd | nd | nd |
| 30/35 | 31/36 | 33/0 | 33/38 | 33/38 | 35/40 | 36/41 | 36/41 | 39/0 | 43/48 | nd | nd | nd | nd | nd | nd | nd |

| FIG. 6A | FIG. 6B |
|---|---|

POM*q    k= 1.15    q= 1.15(all-fire)    1.15(no-fire)

| | | | | | | | | | | | All-Fire Events | | | |
|---|---|---|---|---|---|---|---|---|---|---|---|---|---|---|
| Time | F8 | F7 | F6 | F5 | F41/2 | R2 | F21 | F31 | A3 | R4 | O3 | O21/2 | A2 | A6 | A11 |
| 6.3 | 99.5 | 104.9 | 76.5 | 64.9 | 64.1 | 42.7 | 64.1 | 58.1 | 40.2 | 44.1 | 44.8 | 48.2 | 41.5 | 40.2 | 43.6 |
| 7.5 | 119.9 | 120.0 | 89.5 | 83.8 | 84.2 | 61.3 | 69.2 | 57.2 | 45.0 | 21.3 | 39.9 | 45.3 | 46.3 | 33.0 | 37.6 |
| 8.8 | 99.9 | 121.0 | 98.5 | 89.4 | 97.1 | 36.4 | 91.2 | 77.1 | 50.8 | 38.5 | 48.5 | 53.8 | 43.7 | 47.0 | 47.5 |
| 10.0 | 112.3 | 103.0 | 109.2 | 95.5 | 114.6 | 69.2 | 92.9 | 74.3 | 57.5 | 47.1 | 37.1 | 51.5 | 47.8 | 35.7 | 42.0 |
| 11.3 | 95.2 | 112.8 | 85.8 | 95.6 | 103.8 | 81.4 | 119.5 | 93.0 | 58.9 | 64.7 | 56.8 | 49.4 | 55.7 | 49.0 | 55.3 |
| 12.5 | 129.8 | 102.4 | 97.2 | 90.5 | 105.1 | 97.8 | 107.0 | 75.0 | 79.5 | 69.2 | 62.7 | 47.2 | 55.6 | 47.0 | 53.9 |
| 13.8 | 127.4 | 128.0 | 96.3 | 94.9 | 90.3 | 104.8 | 124.6 | 96.2 | 86.4 | 85.2 | 71.3 | 55.0 | 60.0 | 42.5 | 65.3 |
| 15.0 | 184.6 | 110.0 | 105.4 | 95.8 | 97.6 | 126.6 | 115.5 | 81.5 | 96.5 | 78.2 | 75.3 | 49.9 | 75.0 | 66.1 | 67.0 |
| 16.3 | 190.0 | 153.4 | 95.5 | 100.1 | 81.1 | 129.2 | 124.3 | 108.3 | 98.0 | 75.3 | 80.2 | 63.3 | 77.6 | 60.7 | 77.8 |
| 17.5 | 214.5 | 152.6 | 139.1 | 107.1 | 109.6 | 116.3 | 102.9 | 97.2 | 109.2 | 71.5 | 73.7 | 55.5 | 80.6 | 74.2 | 71.4 |
| 18.8 | 226.6 | 169.5 | 132.6 | 130.7 | 123.0 | 105.8 | 129.4 | 117.8 | 113.3 | 84.7 | 84.8 | 65.4 | 93.0 | 79.0 | 82.5 |
| 20.0 | 245.8 | 156.7 | 146.9 | 131.4 | 134.0 | 116.9 | 117.7 | 116.1 | 118.4 | 71.3 | 90.6 | 69.9 | 99.8 | 94.4 | 79.6 |
| 21.3 | 216.1 | 207.0 | 145.2 | 145.3 | 131.1 | 129.5 | 135.9 | 125.4 | 116.4 | 60.5 | 103.6 | 86.2 | 103.5 | 58.1 | 89.5 |
| 22.5 | 223.0 | 206.9 | 159.9 | 162.4 | 147.3 | 140.2 | 140.7 | 125.3 | 116.4 | 81.4 | 117.5 | 91.5 | 109.8 | 77.9 | 91.8 |
| 23.8 | 204.2 | 216.3 | 161.9 | 162.8 | 150.0 | 154.2 | 157.4 | 125.4 | 120.5 | 73.6 | 125.8 | 113.1 | 121.7 | 67.9 | 102.5 |
| 25.0 | 224.0 | 227.5 | 171.1 | 167.6 | 145.6 | 173.6 | 165.6 | 135.9 | 117.0 | 88.8 | 129.0 | 112.2 | 126.2 | 67.8 | 105.7 |
| 26.3 | 231.9 | 234.5 | 180.5 | 185.8 | 174.3 | 166.0 | 176.7 | 142.8 | 135.3 | 84.2 | 132.3 | 118.7 | 130.1 | 73.4 | 117.9 |
| 27.5 | 265.8 | 232.8 | 204.7 | 202.6 | 184.7 | 156.6 | 185.3 | 154.7 | 138.4 | 107.8 | 135.4 | 114.8 | 139.5 | 96.6 | 120.6 |
| 28.8 | 272.7 | 245.8 | 224.0 | 216.2 | 203.9 | 166.0 | 188.2 | 160.9 | 154.6 | 98.2 | 143.2 | 122.9 | 144.1 | 102.9 | 125.6 |
| 30.0 | 311.0 | 258.6 | 255.3 | 235.2 | 210.4 | 168.8 | 193.7 | 182.0 | 156.0 | 119.0 | 148.4 | 124.1 | 152.4 | 106.4 | 132.9 |
| 31.3 | 307.4 | 256.0 | 255.8 | 252.8 | 230.7 | 188.2 | 193.0 | 188.8 | 163.6 | 110.8 | 157.8 | 135.7 | 157.0 | 120.2 | 143.1 |
| 32.5 | 313.7 | 294.9 | 265.5 | 260.7 | 230.0 | 193.1 | 204.7 | 199.0 | 166.8 | 130.8 | 161.7 | 139.4 | 161.1 | 129.5 | 153.1 |
| 33.8 | 309.5 | 306.3 | 264.3 | 269.8 | 246.4 | 219.3 | 207.9 | 208.7 | 177.9 | 140.0 | 172.7 | 153.9 | 167.0 | 128.4 | 153.8 |
| 35.0 | 349.4 | 317.8 | 278.9 | 270.4 | 253.6 | 231.2 | 220.3 | 218.8 | 178.1 | 161.3 | 169.2 | 159.0 | 171.1 | 150.8 | 170.3 |
| 36.3 | 339.5 | 327.8 | 270.8 | 287.7 | 268.3 | 273.4 | 227.9 | 227.4 | 193.7 | 167.8 | 185.7 | 170.8 | 180.4 | 155.9 | 170.1 |
| 37.5 | 371.9 | 361.9 | 300.1 | 284.4 | 273.9 | 270.9 | 237.6 | 232.4 | 205.8 | 165.4 | 186.5 | 178.8 | 179.2 | 178.9 | 183.2 |
| 38.8 | 432.5 | 373.1 | 315.0 | 304.7 | 280.1 | 277.4 | 248.1 | 250.1 | 213.5 | 172.7 | 208.5 | 187.5 | 201.3 | 193.2 | 178.3 |
| 40.0 | 476.4 | 382.7 | 330.3 | 308.0 | 283.3 | 282.4 | 257.0 | 259.1 | 226.3 | 160.9 | 212.1 | 195.0 | 198.0 | 220.7 | 191.0 |
| 41.3 | 437.6 | 412.1 | 339.0 | 328.4 | 282.7 | 270.6 | 270.5 | 274.3 | 242.9 | 154.4 | 229.0 | 204.7 | 214.4 | 228.1 | 189.1 |
| 42.5 | 488.2 | 443.6 | 346.7 | 332.0 | 291.9 | 256.3 | 285.9 | 286.4 | 252.4 | 157.5 | 235.7 | 211.8 | 217.4 | 240.1 | 202.5 |
| 43.8 | 476.6 | 460.0 | 362.7 | 355.9 | 310.2 | 306.2 | 299.4 | 295.5 | 266.5 | 185.1 | 244.7 | 223.0 | 229.0 | 230.9 | 201.1 |
| 45.0 | 486.9 | 476.5 | 380.6 | 361.9 | 328.2 | 364.8 | 314.9 | 303.9 | 295.0 | 211.2 | 244.2 | 232.6 | 229.1 | 238.9 | 216.1 |
| 46.3 | 475.5 | 477.2 | 394.4 | 385.2 | 344.3 | 396.7 | 329.2 | 318.8 | 317.1 | 236.9 | 252.6 | 240.0 | 243.2 | 239.4 | 215.0 |
| 47.5 | 556.2 | 515.1 | 416.3 | 399.8 | 368.5 | 459.1 | 342.9 | 329.4 | 298.8 | 268.4 | 255.7 | 252.0 | 251.8 | 248.4 | 223.9 |
| 48.8 | 571.1 | 569.6 | 417.1 | 415.9 | 385.9 | 493.3 | 357.1 | 343.7 | 315.0 | 282.7 | 254.0 | 258.8 | 260.8 | 262.5 | 226.5 |
| 50.0 | 617.7 | 573.6 | 443.9 | 430.3 | 395.7 | 500.5 | 370.1 | 361.9 | 331.1 | 288.7 | 273.6 | 273.2 | 278.7 | 281.5 | 238.1 |

All-fire and no-fire events fo a given vehicle: +15% Variation Case - Time vs. POM, ThD = 66mm

FIG. 6A

| All-Fire Events | | | | | | | | | | No-Fire Events | | | | | | |
|---|---|---|---|---|---|---|---|---|---|---|---|---|---|---|---|---|
| P3 | A5 | O11 | P4 | E2 | P2 | O41/2 | O5 | A41 | P11/2 | F1 | E1 | E3 | E4 | E5 | R1 | R3 |
| 46.1 | 37.3 | 39.3 | 37.2 | 23.6 | 27.5 | 45.1 | 44.5 | 28.9 | 32.0 | 30.1 | 17.0 | -10.2 | 22.2 | -7.6 | 25.1 | 23.6 |
| 38.5 | 25.4 | 36.8 | 14.2 | 20.6 | 22.4 | 49.2 | 50.0 | 33.1 | 26.9 | 38.1 | 15.9 | -90.2 | 24.8 | 2.3 | 24.6 | 22.8 |
| 36.0 | 39.9 | 43.3 | 26.8 | 21.1 | 5.8 | 30.4 | 52.6 | 25.3 | 26.0 | 42.8 | 19.6 | -46.4 | 26.6 | 1.8 | 26.6 | 26.4 |
| 26.9 | 38.7 | 45.7 | 9.3 | 19.5 | 22.2 | 45.6 | 51.2 | 35.3 | 25.8 | 50.6 | 17.1 | -70.7 | 32.8 | 15.9 | 31.3 | 27.0 |
| 37.3 | 62.6 | 50.7 | 26.1 | 24.8 | 21.7 | 33.7 | 50.5 | 37.1 | 26.8 | 56.3 | 15.4 | -39.1 | 37.3 | 15.8 | 29.6 | 31.6 |
| 35.8 | 59.2 | 46.0 | 18.2 | 30.7 | 27.8 | 44.7 | 47.2 | 51.9 | 21.8 | 64.3 | 9.4 | -25.2 | 32.1 | 19.3 | 35.2 | 37.5 |
| 40.6 | 61.7 | 48.6 | 46.7 | 36.5 | 42.3 | 47.0 | 49.7 | 59.1 | 27.3 | 78.0 | 6.3 | 44.5 | 30.7 | 20.3 | 34.3 | 45.0 |
| 55.8 | 45.7 | 50.8 | 31.5 | 34.4 | 45.9 | 53.8 | 63.7 | 66.3 | 32.4 | 84.2 | 6.5 | -2.8 | 44.7 | 30.3 | 41.7 | 43.2 |
| 68.5 | 45.8 | 56.4 | 52.1 | 42.2 | 43.2 | 53.0 | 53.4 | 61.7 | 29.6 | 96.0 | 9.2 | 27.1 | 35.6 | 24.7 | 45.6 | 57.5 |
| 66.0 | 30.1 | 51.6 | 46.1 | 39.0 | 48.3 | 53.0 | 65.7 | 62.6 | 33.2 | 101.1 | 17.0 | -5.4 | 40.3 | 23.9 | 46.5 | 49.7 |
| 69.3 | 50.4 | 60.0 | 54.8 | 41.7 | 50.2 | 53.4 | 60.9 | 51.0 | 37.8 | 101.1 | 18.1 | 13.1 | 37.3 | 36.7 | 42.8 | 55.6 |
| 71.3 | 65.3 | 66.8 | 50.3 | 45.7 | 44.5 | 61.8 | 84.2 | 48.4 | 41.2 | 99.8 | 22.0 | -7.6 | 39.2 | 48.2 | 46.5 | 48.2 |
| 68.3 | 71.9 | 70.2 | 60.8 | 57.6 | 58.2 | 74.2 | 71.9 | 53.1 | 45.7 | 92.5 | 19.1 | 0.8 | 32.0 | 46.8 | 40.5 | 66.2 |
| 64.1 | 71.4 | 70.6 | 62.7 | 55.4 | 66.5 | 79.4 | 91.0 | 62.7 | 50.9 | 104.8 | 19.6 | -4.8 | 39.1 | 58.4 | 36.4 | 64.5 |
| 68.9 | 88.9 | 83.1 | 70.2 | 65.4 | 61.8 | 89.3 | 85.6 | 74.7 | 53.4 | 102.5 | 16.1 | 2.1 | 33.6 | 72.1 | 38.0 | 78.5 |
| 76.9 | 79.8 | 89.8 | 71.1 | 69.6 | 47.5 | 94.8 | 86.9 | 87.9 | 53.9 | 128.1 | 20.6 | -1.0 | 39.6 | 74.6 | 39.3 | 69.6 |
| 85.6 | 86.2 | 98.5 | 71.3 | 76.6 | 64.5 | 102.7 | 86.6 | 94.8 | 52.7 | 133.0 | 24.4 | -0.5 | 35.8 | 75.4 | 46.9 | 81.0 |
| 71.8 | 88.0 | 99.3 | 78.0 | 94.6 | 75.0 | 101.6 | 92.9 | 94.1 | 55.9 | 161.0 | 27.6 | -0.5 | 33.0 | 80.9 | 52.5 | 65.5 |
| 89.3 | 108.5 | 105.7 | 78.7 | 99.4 | 75.1 | 105.7 | 99.9 | 91.5 | 68.2 | 156.5 | 32.4 | -1.4 | 31.6 | 75.8 | 55.8 | 66.0 |
| 82.4 | 124.8 | 107.6 | 96.9 | 111.2 | 68.9 | 109.8 | 107.2 | 92.0 | 74.3 | 167.1 | 32.4 | -5.0 | 33.4 | 77.4 | 59.1 | 66.9 |
| 82.8 | 138.1 | 115.7 | 95.5 | 108.2 | 92.6 | 109.8 | 125.9 | 98.5 | 79.8 | 153.0 | 34.1 | -4.6 | 33.5 | 80.2 | 65.1 | 80.9 |
| 78.3 | 139.1 | 116.8 | 109.1 | 103.3 | 99.7 | 115.4 | 120.6 | 112.8 | 85.0 | 164.8 | 33.1 | -6.2 | 31.5 | 80.9 | 63.9 | 85.7 |
| 109.2 | 153.7 | 121.5 | 97.8 | 97.8 | 84.8 | 124.4 | 142.7 | 127.0 | 90.2 | 155.1 | 36.6 | -2.0 | 36.0 | 83.1 | 66.7 | 98.6 |
| 101.3 | 166.1 | 134.3 | 121.7 | 97.8 | 91.6 | 141.1 | 139.8 | 130.2 | 81.9 | 167.7 | 39.0 | -5.5 | 37.3 | 84.8 | 69.4 | 105.6 |
| 138.6 | 165.7 | 139.3 | 111.4 | 110.0 | 102.3 | 156.6 | 157.9 | 146.3 | 82.1 | 169.3 | 47.0 | -4.8 | 40.1 | 84.2 | 74.8 | 107.5 |
| 155.8 | 168.2 | 143.1 | 128.7 | 129.7 | 99.5 | 161.7 | 149.7 | 144.6 | 87.6 | 181.1 | 52.6 | -5.2 | 39.7 | 79.5 | 76.6 | 102.0 |
| 182.0 | 174.8 | 149.1 | 123.0 | 131.1 | 102.9 | 172.2 | 144.9 | 149.6 | 78.1 | 183.7 | 59.8 | -3.8 | 43.6 | 77.8 | 81.4 | 100.9 |
| 186.9 | 192.3 | 161.8 | 147.0 | 150.0 | 116.3 | 167.0 | 150.0 | 144.6 | 75.9 | 194.5 | 65.0 | -7.3 | 45.1 | 73.7 | 85.2 | 106.1 |
| 207.2 | 188.6 | 165.3 | 152.4 | 151.9 | 125.2 | 173.4 | 148.9 | 155.5 | 94.5 | 199.5 | 68.6 | -3.9 | 48.2 | 76.8 | 90.6 | 109.5 |
| 201.1 | 207.0 | 175.4 | 160.9 | 168.5 | 136.7 | 167.3 | 145.4 | 149.5 | 99.7 | 211.0 | 79.2 | -7.4 | 48.5 | 76.8 | 95.1 | 119.6 |
| 220.5 | 226.9 | 182.6 | 167.5 | 165.8 | 158.7 | 185.3 | 157.0 | 161.7 | 108.9 | 219.1 | 79.8 | -7.2 | 52.8 | 78.0 | 99.6 | 127.2 |
| 221.5 | 239.9 | 194.5 | 166.2 | 197.8 | 195.8 | 185.4 | 178.9 | 165.7 | 122.7 | 228.6 | 81.9 | -9.1 | 55.3 | 80.7 | 105.4 | 132.7 |
| 218.4 | 251.3 | 200.9 | 174.6 | 200.2 | 218.5 | 198.2 | 176.1 | 165.4 | 133.6 | 238.2 | 74.8 | -7.9 | 59.8 | 85.0 | 109.2 | 130.7 |
| 258.8 | 266.2 | 209.0 | 188.6 | 235.9 | 221.2 | 203.0 | 185.2 | 167.3 | 131.7 | 247.8 | 63.7 | -9.0 | 59.3 | 87.6 | 116.6 | 135.4 |
| 278.8 | 264.5 | 218.9 | 183.9 | -132.2 | 248.0 | 211.0 | 185.1 | 194.0 | 137.4 | 258.9 | 62.9 | -7.1 | 62.2 | 84.7 | 123.1 | 133.4 |
| 291.1 | 268.4 | 229.3 | 207.6 | -137.3 | 233.6 | 210.5 | 196.6 | 194.7 | 142.9 | 268.7 | 58.4 | -7.7 | 62.7 | 89.3 | 131.5 | 142.7 |

FIG. 6B

ThS1 = 0.14 m/s; ThS2 = 0.6 m/s
(Vr)max = (Vrad*q-VradF1*k)max       k= 1.15       q= 1.15(all-fire)       1.15 (no-fire)

| Time | F8 | F7 | F6 | F5 | F41/2 | R2 | F21 | F31 | A3 | R4 | O3 | O21/2 | A2 | A6 | A11 | P3 |
|---|---|---|---|---|---|---|---|---|---|---|---|---|---|---|---|---|
| | | | | | | | | | | | | | | All-Fire Events | | |
| 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 1.25 | 0.39 | 0.25 | 0.00 | 0.19 | 0.12 | 0.70 | 0.00 | 0.00 | 0.15 | 0.42 | 0.70 | 0.70 | 0.11 | 0.25 | 0.20 | 0.00 |
| 2.50 | 1.15 | 0.90 | 0.22 | 0.54 | 0.35 | 1.18 | 0.11 | 0.26 | 0.75 | 1.17 | 1.00 | 1.14 | 0.40 | 0.39 | 0.46 | 0.35 |
| 3.75 | 1.39 | 1.47 | 0.64 | 1.13 | 0.56 | 1.18 | 0.42 | 0.26 | 0.75 | 1.17 | 1.00 | 1.14 | 0.42 | 0.39 | 0.46 | 0.96 |
| 5.00 | 1.50 | 1.47 | 1.00 | 1.13 | 0.70 | 1.18 | 0.42 | 0.34 | 0.75 | 1.17 | 1.00 | 1.14 | 0.42 | 0.39 | 0.46 | 0.96 |
| 6.25 | 1.50 | 1.61 | 1.00 | 1.13 | 0.70 | 1.18 | 0.42 | 0.43 | 0.75 | 1.17 | 1.00 | 1.14 | 0.42 | 0.39 | 0.46 | 0.96 |
| 7.50 | 1.50 | 1.61 | 1.00 | 1.13 | 0.70 | 1.18 | 0.42 | 0.43 | 0.75 | 1.17 | 1.00 | 1.14 | 0.42 | 0.39 | 0.46 | 0.96 |
| 8.75 | 1.50 | 1.61 | 1.00 | 1.13 | 0.70 | 1.18 | 0.42 | 0.43 | 1.14 | 1.17 | 1.00 | 1.14 | 0.42 | 0.45 | 0.46 | 0.96 |
| 10.00 | 1.50 | 1.61 | 1.00 | 1.26 | 1.39 | 1.18 | 0.42 | 0.50 | 1.14 | 1.17 | 1.00 | 1.14 | 0.42 | 0.89 | 0.46 | 0.96 |
| 11.25 | 1.50 | 1.61 | 1.00 | 1.26 | 1.39 | 1.18 | 0.42 | 0.50 | 1.14 | 1.17 | 1.00 | 1.14 | 0.42 | 0.89 | 0.46 | 0.96 |
| 12.50 | 1.70 | 1.76 | 1.00 | 1.26 | 1.39 | 1.18 | 0.42 | 0.50 | 1.14 | 1.17 | 1.00 | 1.14 | 0.70 | 0.89 | 0.46 | 0.96 |
| 13.75 | 2.08 | 2.33 | 1.00 | 1.26 | 1.39 | 1.18 | 0.42 | 0.50 | 1.14 | 1.17 | 1.00 | 1.14 | 0.70 | 0.89 | 0.46 | 1.25 |
| 15.00 | 2.61 | 2.73 | 1.00 | 1.26 | 1.39 | 1.18 | 0.42 | 0.50 | 1.14 | 1.17 | 1.00 | 1.14 | 0.70 | 0.89 | 0.46 | 1.25 |
| 16.25 | 2.61 | 3.68 | 1.00 | 1.32 | 1.39 | 1.51 | 0.42 | 0.50 | 1.14 | 1.17 | 1.00 | 1.14 | 0.74 | 1.63 | 0.46 | 1.73 |
| 17.50 | 2.61 | 4.09 | 1.00 | 1.47 | 1.39 | 1.91 | 0.42 | 0.50 | 1.14 | 1.17 | 1.00 | 1.14 | 0.74 | 1.63 | 0.46 | 1.79 |
| 18.75 | 2.61 | 4.11 | 1.00 | 2.18 | 1.39 | 2.61 | 0.42 | 0.57 | 1.14 | 1.17 | 1.00 | 1.14 | 1.07 | 1.63 | 0.46 | 1.79 |
| 20.00 | 2.61 | 4.11 | 1.00 | 2.27 | 1.39 | 3.04 | 0.79 | 0.65 | 1.14 | 1.17 | 1.00 | 1.14 | 1.08 | 1.63 | 0.46 | 1.79 |
| 21.25 | 2.61 | 4.11 | 1.00 | 2.27 | 1.39 | 3.73 | 0.79 | 0.65 | 1.78 | 1.17 | 1.00 | 1.14 | 1.33 | 2.11 | 0.46 | 1.79 |
| 22.50 | 2.61 | 4.11 | 1.00 | 2.47 | 1.39 | 4.28 | 0.79 | 1.36 | 2.61 | 1.72 | 1.00 | 1.14 | 2.20 | 2.11 | 0.46 | 1.79 |
| 23.75 | 2.61 | 4.11 | 1.00 | 2.62 | 1.39 | 4.28 | 0.79 | 1.36 | 2.61 | 1.72 | 1.00 | 1.14 | 2.34 | 2.11 | 0.46 | 1.79 |
| 25.00 | 2.61 | 4.11 | 1.00 | 3.01 | 1.39 | 4.28 | 0.79 | 1.36 | 3.01 | 1.72 | 1.00 | 1.14 | 2.86 | 2.13 | 0.46 | 1.79 |
| 26.25 | 2.61 | 4.11 | 1.00 | 3.29 | 1.80 | 4.28 | 0.94 | 1.36 | 3.99 | 1.72 | 1.00 | 1.14 | 2.86 | 2.13 | 0.46 | 1.89 |
| 27.50 | 2.61 | 4.11 | 1.00 | 3.65 | 1.80 | 4.28 | 0.94 | 1.36 | 3.99 | 1.72 | 1.32 | 1.14 | 2.86 | 2.13 | 0.46 | 2.40 |
| 28.75 | 2.61 | 4.11 | 1.00 | 4.12 | 1.80 | 4.28 | 0.94 | 1.36 | 3.99 | 1.72 | 1.68 | 1.14 | 2.86 | 2.13 | 0.46 | 2.40 |
| 30.00 | 2.61 | 4.11 | 1.00 | 4.12 | 1.80 | 4.28 | 0.94 | 1.36 | 3.99 | 1.72 | 1.68 | 1.14 | 2.86 | 2.13 | 0.46 | 2.40 |
| 31.25 | 2.61 | 4.11 | 1.00 | 4.12 | 2.39 | 4.28 | 0.94 | 2.01 | 4.21 | 1.72 | 1.68 | 1.14 | 2.86 | 2.13 | 0.46 | 2.40 |
| 32.50 | 2.61 | 4.11 | 1.00 | 4.12 | 2.39 | 4.28 | 0.94 | 3.08 | 4.85 | 1.72 | 1.68 | 1.14 | 3.01 | 2.13 | 1.26 | 2.40 |
| 33.75 | 2.61 | 4.11 | 1.00 | 4.12 | 2.39 | 4.28 | 0.94 | 3.08 | 4.93 | 1.72 | 1.68 | 1.14 | 3.01 | 2.13 | 1.79 | 2.40 |
| 35.00 | 2.61 | 4.11 | 1.00 | 4.12 | 2.39 | 4.28 | 0.94 | 3.08 | 5.77 | 1.72 | 1.68 | 1.14 | 3.58 | 2.13 | 2.65 | 2.40 |
| 36.25 | 2.61 | 4.11 | 1.00 | 4.12 | 2.39 | 4.28 | 0.94 | 3.08 | 5.77 | 1.72 | 1.68 | 1.14 | 3.58 | 2.13 | 2.65 | 2.40 |
| 37.50 | 2.61 | 4.11 | 1.00 | 4.12 | 2.39 | 4.28 | 1.04 | 3.08 | 5.77 | 1.72 | 1.68 | 1.14 | 3.58 | 2.13 | 2.65 | 2.40 |
| 38.75 | 2.61 | 4.11 | 1.00 | 4.12 | 2.39 | 4.28 | 1.46 | 3.08 | 5.77 | 1.72 | 1.68 | 1.14 | 3.58 | 2.13 | 2.65 | 2.40 |
| 40.00 | 2.75 | 4.11 | 1.00 | 4.12 | 2.39 | 4.28 | 1.63 | 3.08 | 5.77 | 1.72 | 1.68 | 1.14 | 3.58 | 2.13 | 2.71 | 2.40 |
| 41.25 | 3.00 | 4.11 | 1.00 | 4.12 | 2.39 | 4.28 | 1.86 | 3.08 | 5.77 | 1.72 | 2.38 | 1.14 | 3.58 | 2.13 | 2.71 | 2.40 |
| 42.50 | 3.00 | 4.11 | 1.00 | 4.12 | 2.39 | 4.28 | 1.86 | 3.08 | 5.77 | 1.72 | 2.56 | 1.14 | 3.58 | 2.13 | 2.71 | 2.40 |
| 43.75 | 3.00 | 4.11 | 1.00 | 4.12 | 2.39 | 4.28 | 1.86 | 3.08 | 5.77 | 1.72 | 3.25 | 1.14 | 3.58 | 2.13 | 2.71 | 2.40 |
| 45.00 | 3.00 | 4.11 | 1.00 | 4.12 | 2.39 | 4.28 | 1.86 | 3.08 | 5.77 | 1.72 | 3.55 | 1.14 | 3.58 | 2.20 | 2.71 | 2.40 |
| 46.25 | 3.00 | 4.11 | 1.00 | 4.12 | 2.39 | 4.28 | 1.86 | 3.08 | 5.77 | 1.72 | 3.56 | 1.14 | 3.58 | 2.61 | 2.71 | 2.40 |
| 47.50 | 3.00 | 4.11 | 1.00 | 4.12 | 2.39 | 4.28 | 1.86 | 3.08 | 5.77 | 1.72 | 3.56 | 1.14 | 3.58 | 2.61 | 2.71 | 2.40 |
| 48.75 | 3.00 | 4.11 | 1.00 | 4.12 | 2.39 | 4.28 | 1.86 | 3.08 | 5.77 | 1.72 | 3.56 | 1.14 | 3.58 | 2.61 | 2.71 | 2.40 |
| 50.00 | 3.00 | 4.11 | 1.00 | 4.12 | 2.39 | 4.28 | 1.86 | 3.08 | 5.77 | 1.72 | 3.56 | 1.14 | 3.58 | 2.92 | 2.71 | 2.40 |
| Results | 8/8 | 8/8 | 8/8 | 9/9 | 9/9 | 11/11 | 9/0 | 10/0 | 14/14 | 14/14 | 15/15 | 21/21 | 16/16 | 18/18 | 16/0 | 18/18 |
| Required | 10/15 | 11/16 | 16/21 | 18/23 | 19/24 | 20/25 | 21/0 | 21/0 | 24/29 | 24/29 | 25/30 | 28/33 | 28/33 | 28/33 | 30/0 | 30/35 |

All-fire and no-fire events fo a given vehicle: +15% Variation Case - Time vs. BSM, ThS1 = 0.14 m/s, ThS2 = 0.6

| All-Fire Events | | | | | | | | No-Fire Events | | | | | | |
|---|---|---|---|---|---|---|---|---|---|---|---|---|---|---|
| A5 | O11 | P4 | E2 | P2 | O41/2 | O5 | A41 | P11/2 | F1 | E1 | E3 | E4 | E5 | R1 | R3 |
| 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 0.18 | 0.31 | 0.03 | 0.70 | 0.62 | 0.00 | 0.00 | 0.16 | 0.06 | 0.00 | 0.04 | 0.01 | 0.70 | 0.04 | 0.13 | 0.00 |
| 0.30 | 0.58 | 0.40 | 1.45 | 1.01 | 0.08 | 0.00 | 0.16 | 0.82 | 0.00 | 0.04 | 0.63 | 1.46 | 0.08 | 0.13 | 0.00 |
| 0.42 | 0.58 | 0.63 | 2.09 | 1.01 | 0.39 | 0.00 | 0.16 | 0.82 | 0.00 | 0.04 | 0.63 | 2.04 | 0.08 | 0.13 | 0.01 |
| 0.42 | 0.58 | 0.63 | 2.46 | 1.01 | 0.59 | 0.00 | 0.16 | 0.82 | 0.00 | 0.04 | 0.63 | 2.04 | 0.08 | 0.13 | 0.01 |
| 0.42 | 0.58 | 0.63 | 3.19 | 1.01 | 0.59 | 0.28 | 0.16 | 0.82 | 0.00 | 0.04 | 0.63 | 2.04 | 0.08 | 0.13 | 0.01 |
| 0.42 | 0.58 | 0.63 | 3.24 | 1.01 | 0.59 | 0.75 | 0.16 | 0.82 | 0.00 | 0.04 | 0.63 | 2.44 | 0.08 | 0.13 | 0.01 |
| 0.42 | 0.58 | 0.63 | 3.24 | 1.01 | 0.59 | 0.75 | 0.16 | 0.82 | 0.00 | 0.04 | 0.63 | 2.60 | 0.08 | 0.13 | 0.01 |
| 0.42 | 0.58 | 0.63 | 3.24 | 1.01 | 0.59 | 0.75 | 0.16 | 0.82 | 0.00 | 0.04 | 0.63 | 2.60 | 0.08 | 0.13 | 0.01 |
| 0.42 | 0.58 | 0.63 | 3.24 | 1.01 | 0.59 | 0.75 | 0.16 | 0.82 | 0.00 | 0.04 | 0.63 | 2.60 | 0.08 | 0.13 | 0.01 |
| 0.42 | 0.58 | 0.63 | 3.24 | 1.01 | 0.59 | 0.75 | 0.16 | 0.82 | 0.00 | 0.04 | 0.63 | 2.60 | 0.08 | 0.13 | 0.01 |
| 0.61 | 0.58 | 0.63 | 3.24 | 1.01 | 0.59 | 0.75 | 0.16 | 0.82 | 0.00 | 0.04 | 0.63 | 2.60 | 0.08 | 0.13 | 0.01 |
| 0.61 | 0.58 | 0.63 | 3.24 | 1.51 | 0.59 | 0.75 | 0.16 | 0.82 | 0.00 | 0.04 | 0.63 | 2.60 | 0.08 | 0.13 | 0.01 |
| 0.61 | 0.59 | 0.91 | 3.24 | 2.47 | 0.77 | 0.75 | 0.16 | 0.82 | 0.00 | 0.04 | 0.63 | 2.60 | 0.08 | 0.13 | 0.01 |
| 0.61 | 0.59 | 0.91 | 3.24 | 2.77 | 0.77 | 0.75 | 0.16 | 0.82 | 0.00 | 0.04 | 0.63 | 2.60 | 0.08 | 0.13 | 0.01 |
| 1.02 | 0.59 | 0.92 | 3.24 | 3.39 | 0.77 | 0.75 | 0.16 | 0.82 | 0.00 | 0.04 | 0.63 | 2.60 | 0.08 | 0.13 | 0.01 |
| 1.02 | 0.59 | 1.51 | 3.24 | 3.39 | 0.77 | 0.83 | 0.16 | 0.82 | 0.00 | 0.04 | 0.63 | 2.60 | 0.08 | 0.13 | 0.01 |
| 1.02 | 0.59 | 2.19 | 3.24 | 3.39 | 1.19 | 0.83 | 0.16 | 0.87 | 0.00 | 0.04 | 0.63 | 2.60 | 0.08 | 0.13 | 0.01 |
| 1.02 | 0.59 | 2.87 | 3.24 | 3.59 | 1.19 | 0.83 | 0.16 | 1.93 | 0.00 | 0.04 | 0.63 | 2.60 | 0.08 | 0.13 | 0.01 |
| 1.02 | 0.59 | 2.87 | 3.24 | 3.59 | 1.19 | 0.83 | 0.16 | 2.08 | 0.00 | 0.04 | 0.63 | 2.60 | 0.08 | 0.13 | 0.01 |
| 1.02 | 0.59 | 2.87 | 3.24 | 3.59 | 1.19 | 0.83 | 0.16 | 2.08 | 0.00 | 0.04 | 0.63 | 2.60 | 0.08 | 0.13 | 0.01 |
| 1.86 | 0.59 | 2.87 | 3.24 | 3.59 | 1.19 | 1.37 | 0.16 | 2.08 | 0.00 | 0.04 | 0.63 | 2.60 | 0.08 | 0.13 | 0.01 |
| 2.34 | 0.59 | 2.87 | 3.24 | 3.59 | 1.19 | 1.88 | 0.16 | 2.08 | 0.00 | 0.04 | 0.63 | 2.60 | 0.08 | 0.13 | 0.01 |
| 2.81 | 0.59 | 2.87 | 3.24 | 3.59 | 1.19 | 1.97 | 0.16 | 2.08 | 0.00 | 0.04 | 0.63 | 2.60 | 0.08 | 0.13 | 0.01 |
| 2.95 | 0.59 | 2.87 | 3.24 | 3.59 | 1.19 | 2.59 | 0.16 | 2.08 | 0.00 | 0.04 | 0.63 | 2.60 | 0.08 | 0.13 | 0.01 |
| 2.95 | 0.59 | 2.87 | 3.24 | 3.59 | 1.19 | 3.23 | 0.16 | 2.08 | 0.00 | 0.04 | 0.63 | 2.60 | 0.08 | 0.13 | 0.01 |
| 2.95 | 0.59 | 2.87 | 3.24 | 3.59 | 1.50 | 3.92 | 0.16 | 2.08 | 0.00 | 0.04 | 0.63 | 2.60 | 0.08 | 0.13 | 0.01 |
| 3.13 | 0.59 | 2.87 | 3.24 | 3.59 | 2.35 | 4.25 | 0.16 | 2.08 | 0.00 | 0.04 | 0.63 | 2.60 | 0.08 | 0.13 | 0.01 |
| 3.68 | 0.59 | 2.87 | 3.24 | 3.59 | 2.35 | 4.25 | 0.53 | 2.08 | 0.00 | 0.04 | 0.63 | 2.60 | 0.08 | 0.13 | 0.01 |
| 3.68 | 0.59 | 2.87 | 3.24 | 3.59 | 2.35 | 4.25 | 0.53 | 2.08 | 0.00 | 0.04 | 0.63 | 2.60 | 0.08 | 0.13 | 0.01 |
| 3.68 | 0.59 | 2.87 | 3.24 | 3.59 | 2.35 | 4.25 | 0.53 | 2.08 | 0.00 | 0.04 | 0.63 | 2.60 | 0.08 | 0.13 | 0.01 |
| 3.68 | 0.59 | 2.87 | 3.24 | 3.59 | 2.35 | 4.25 | 0.53 | 2.08 | 0.00 | 0.04 | 0.63 | 2.60 | 0.08 | 0.13 | 0.01 |
| 3.68 | 0.59 | 2.87 | 3.24 | 3.59 | 2.35 | 4.25 | 0.53 | 2.08 | 0.00 | 0.04 | 0.63 | 2.60 | 0.08 | 0.13 | 0.01 |
| 3.68 | 0.59 | 2.87 | 3.24 | 3.59 | 2.35 | 4.25 | 0.53 | 2.08 | 0.00 | 0.04 | 0.63 | 2.60 | 0.08 | 0.13 | 0.01 |
| 3.68 | 0.59 | 2.87 | 3.24 | 3.59 | 2.35 | 4.25 | 0.81 | 2.13 | 0.00 | 0.04 | 0.63 | 2.60 | 0.08 | 0.13 | 0.01 |
| 3.68 | 0.59 | 2.87 | 3.24 | 3.59 | 2.35 | 4.25 | 1.31 | 2.42 | 0.00 | 0.04 | 0.63 | 2.60 | 0.08 | 0.13 | 0.01 |
| 3.68 | 0.59 | 2.87 | 3.24 | 3.59 | 2.35 | 4.25 | 1.41 | 2.42 | 0.00 | 0.04 | 0.63 | 2.60 | 0.08 | 0.13 | 0.01 |
| 3.68 | 0.59 | 2.87 | 3.24 | 3.59 | 2.35 | 4.25 | 1.56 | 2.42 | 0.00 | 0.04 | 0.63 | 2.60 | 0.08 | 0.13 | 0.01 |
| 3.68 | 0.59 | 2.87 | 3.24 | 3.59 | 2.35 | 4.25 | 1.56 | 2.42 | 0.00 | 0.04 | 0.63 | 2.60 | 0.08 | 0.13 | 0.01 |
| 3.68 | 0.59 | 2.87 | 3.24 | 3.59 | 2.35 | 4.25 | 1.56 | 2.42 | 0.00 | 0.04 | 0.63 | 2.60 | 0.08 | 0.13 | 0.01 |
| 23/23 | 20/0 | 25/25 | 26/26 | 28/28 | 23/23 | 21/21 | 25/0 | 30/30 | nd | nd | nd | nd | nd | nd | nd |
| 31/36 | 33/0 | 33/38 | 33/38 | 35/40 | 36/41 | 36/41 | 39/0 | 43/48 | nd | nd | nd | nd | nd | nd | nd |

FIG. 7B

| POM*q | | | | | k= | 1.15 | q= | 0.85(all-fire) | | 0.85(no-fire) | | | | | | |
|---|---|---|---|---|---|---|---|---|---|---|---|---|---|---|---|---|
| | | | | | | | | | | All-Fire Events | | | | | | |
| Time | F8 | F7 | F6 | F5 | F41/2 | R2 | F21 | F31 | A3 | R4 | O3 | O21/2 | A2 | A6 | A11 | P3 | A5 |
| 6.3 | 73.5 | 77.5 | 56.5 | 48.0 | 47.4 | 31.6 | 47.4 | 42.9 | 29.7 | 32.6 | 33.1 | 35.6 | 30.7 | 29.7 | 32.2 | 34.1 | 27.6 |
| 7.5 | 88.6 | 88.7 | 66.2 | 61.9 | 62.3 | 45.3 | 51.2 | 42.3 | 33.3 | 15.8 | 29.5 | 33.5 | 34.2 | 24.4 | 27.8 | 28.4 | 18.8 |
| 8.8 | 73.9 | 89.4 | 72.8 | 66.1 | 71.8 | 26.9 | 67.4 | 57.0 | 37.5 | 28.4 | 35.9 | 39.7 | 32.3 | 34.7 | 35.1 | 26.6 | 29.5 |
| 10.0 | 83.0 | 76.1 | 80.7 | 70.6 | 84.7 | 51.1 | 68.7 | 55.0 | 42.5 | 34.8 | 27.4 | 38.1 | 35.3 | 26.4 | 31.0 | 19.9 | 28.6 |
| 11.3 | 70.4 | 83.4 | 63.4 | 70.7 | 76.7 | 60.2 | 88.3 | 68.8 | 43.6 | 47.9 | 42.0 | 36.5 | 41.1 | 36.2 | 40.9 | 27.6 | 46.2 |
| 12.5 | 95.9 | 75.7 | 71.9 | 66.9 | 77.7 | 72.3 | 79.1 | 55.4 | 58.7 | 51.2 | 46.4 | 34.9 | 41.1 | 34.8 | 39.8 | 26.4 | 43.8 |
| 13.8 | 94.2 | 94.6 | 71.1 | 70.2 | 66.8 | 77.5 | 92.1 | 71.1 | 63.9 | 63.0 | 52.7 | 40.7 | 44.4 | 31.4 | 48.2 | 30.0 | 45.6 |
| 15.0 | 136.4 | 81.3 | 77.9 | 70.8 | 72.1 | 93.6 | 85.4 | 60.3 | 71.3 | 57.8 | 55.6 | 36.9 | 55.4 | 48.8 | 49.6 | 41.3 | 33.7 |
| 16.3 | 140.4 | 113.4 | 70.6 | 74.0 | 59.9 | 95.5 | 91.8 | 80.0 | 72.4 | 55.6 | 59.3 | 46.8 | 57.3 | 44.8 | 57.5 | 50.6 | 33.8 |
| 17.5 | 158.5 | 112.8 | 102.8 | 79.2 | 81.0 | 86.0 | 76.0 | 71.9 | 80.7 | 52.8 | 54.5 | 41.0 | 59.5 | 54.9 | 52.8 | 48.8 | 22.3 |
| 18.8 | 167.5 | 125.3 | 98.0 | 96.6 | 90.9 | 78.2 | 95.6 | 87.0 | 83.8 | 62.6 | 62.7 | 48.3 | 68.7 | 58.4 | 61.0 | 51.2 | 37.3 |
| 20.0 | 181.6 | 115.8 | 108.6 | 97.1 | 99.0 | 86.4 | 87.0 | 85.8 | 87.5 | 52.7 | 67.0 | 51.6 | 73.8 | 69.8 | 58.8 | 52.7 | 48.3 |
| 21.3 | 159.7 | 153.0 | 107.3 | 107.4 | 96.9 | 95.7 | 100.5 | 92.7 | 86.0 | 44.7 | 76.6 | 63.7 | 76.5 | 42.9 | 66.1 | 50.5 | 53.1 |
| 22.5 | 164.9 | 152.9 | 118.2 | 120.0 | 108.9 | 103.6 | 104.0 | 92.6 | 86.0 | 60.2 | 86.9 | 67.7 | 81.1 | 57.6 | 67.9 | 47.4 | 52.8 |
| 23.8 | 150.9 | 159.9 | 119.7 | 120.3 | 110.8 | 114.0 | 116.3 | 92.7 | 89.1 | 54.4 | 93.0 | 83.6 | 90.0 | 50.2 | 75.8 | 50.9 | 65.7 |
| 25.0 | 165.6 | 168.1 | 126.5 | 123.9 | 107.6 | 128.3 | 122.4 | 100.5 | 86.4 | 65.7 | 95.4 | 83.0 | 93.3 | 50.1 | 78.2 | 56.9 | 59.0 |
| 26.3 | 171.4 | 173.3 | 133.4 | 137.3 | 128.8 | 122.7 | 130.6 | 105.5 | 100.0 | 62.2 | 97.8 | 87.7 | 96.2 | 54.3 | 87.2 | 63.3 | 63.7 |
| 27.5 | 196.5 | 172.1 | 151.3 | 149.8 | 136.6 | 115.8 | 137.0 | 114.3 | 102.3 | 79.7 | 100.1 | 84.9 | 103.1 | 71.4 | 89.2 | 53.0 | 65.0 |
| 28.8 | 201.6 | 181.7 | 165.5 | 159.8 | 150.7 | 122.7 | 139.1 | 118.9 | 114.3 | 72.6 | 105.8 | 90.9 | 106.5 | 76.1 | 92.9 | 66.0 | 80.2 |
| 30.0 | 229.9 | 191.1 | 188.7 | 173.8 | 155.5 | 124.8 | 143.2 | 134.5 | 115.3 | 87.9 | 109.7 | 91.8 | 112.7 | 78.6 | 98.2 | 60.9 | 92.3 |
| 31.3 | 227.2 | 189.2 | 189.1 | 186.9 | 170.5 | 139.1 | 142.6 | 139.6 | 120.9 | 81.9 | 116.6 | 100.3 | 116.1 | 88.8 | 105.8 | 61.2 | 102.0 |
| 32.5 | 231.9 | 218.0 | 196.2 | 192.7 | 170.0 | 142.7 | 151.3 | 147.1 | 123.3 | 96.7 | 119.5 | 103.0 | 119.1 | 95.7 | 113.1 | 57.9 | 102.8 |
| 33.8 | 228.8 | 226.4 | 195.4 | 199.4 | 182.1 | 162.1 | 153.6 | 154.3 | 131.5 | 103.5 | 127.6 | 113.7 | 123.4 | 94.9 | 113.7 | 80.7 | 113.6 |
| 35.0 | 258.3 | 234.9 | 206.2 | 199.8 | 187.4 | 170.9 | 162.8 | 161.8 | 131.6 | 119.2 | 125.0 | 117.6 | 126.5 | 111.4 | 125.9 | 74.9 | 122.8 |
| 36.3 | 250.9 | 242.3 | 200.2 | 212.6 | 198.3 | 202.1 | 168.4 | 168.1 | 143.2 | 124.0 | 137.2 | 126.3 | 133.3 | 115.3 | 125.8 | 102.4 | 122.5 |
| 37.5 | 274.9 | 267.5 | 221.8 | 210.2 | 202.4 | 200.2 | 175.6 | 171.7 | 152.1 | 122.2 | 137.9 | 132.2 | 132.5 | 132.2 | 135.4 | 115.2 | 124.3 |
| 38.8 | 319.7 | 275.8 | 232.8 | 225.2 | 207.0 | 205.0 | 183.4 | 184.8 | 157.8 | 127.6 | 154.1 | 138.6 | 148.8 | 142.8 | 131.8 | 134.5 | 129.2 |
| 40.0 | 352.2 | 282.9 | 244.2 | 227.6 | 209.4 | 208.8 | 190.0 | 191.5 | 167.3 | 118.9 | 156.7 | 144.1 | 146.3 | 163.1 | 141.2 | 138.2 | 142.1 |
| 41.3 | 323.4 | 304.6 | 250.5 | 242.7 | 209.0 | 200.0 | 199.9 | 202.7 | 179.5 | 114.1 | 169.3 | 151.3 | 158.4 | 168.6 | 139.8 | 153.1 | 139.4 |
| 42.5 | 360.8 | 327.9 | 256.3 | 245.4 | 215.7 | 189.5 | 211.4 | 211.7 | 186.5 | 116.4 | 174.2 | 156.6 | 160.7 | 177.5 | 149.7 | 148.7 | 153.0 |
| 43.8 | 352.3 | 340.0 | 268.1 | 263.1 | 229.3 | 226.3 | 221.3 | 218.4 | 197.0 | 136.8 | 180.9 | 164.9 | 169.3 | 170.6 | 148.6 | 163.0 | 167.7 |
| 45.0 | 359.8 | 352.2 | 281.3 | 267.5 | 242.6 | 269.6 | 232.7 | 224.6 | 218.0 | 156.1 | 180.5 | 171.9 | 169.4 | 176.5 | 159.7 | 163.7 | 177.3 |
| 46.3 | 351.4 | 352.7 | 291.5 | 284.7 | 254.5 | 293.2 | 243.4 | 235.6 | 234.4 | 175.1 | 186.7 | 177.4 | 179.7 | 176.9 | 158.9 | 161.4 | 185.8 |
| 47.5 | 411.1 | 380.8 | 307.7 | 295.5 | 272.4 | 339.4 | 253.5 | 243.5 | 220.8 | 198.4 | 189.0 | 186.2 | 186.1 | 183.6 | 165.5 | 191.3 | 196.8 |
| 48.8 | 422.1 | 421.0 | 308.3 | 307.4 | 285.2 | 364.6 | 263.9 | 254.0 | 232.9 | 208.9 | 187.8 | 191.3 | 192.8 | 194.0 | 167.4 | 206.1 | 195.5 |
| 50.0 | 456.6 | 424.0 | 328.1 | 318.0 | 292.5 | 369.9 | 273.5 | 267.5 | 244.7 | 213.4 | 202.3 | 202.0 | 206.0 | 208.1 | 176.0 | 215.2 | 198.4 |

All-fire and no-fire events of a given vehicle: -15% Variation Case - Time vs. POM, ThD = 66 mm

| All-Fire Events | | | | | | | No-Fire Events | | | | | | |
|---|---|---|---|---|---|---|---|---|---|---|---|---|---|
| O11 | P4 | E2 | P2 | O41/2 | O5 | A41 | P11/2 | F1 | E1 | E3 | E4 | E5 | R1 | R3 |
| 29.0 | 27.5 | 17.4 | 20.4 | 33.3 | 32.9 | 21.4 | 23.7 | 22.3 | 12.5 | -7.5 | 16.4 | -5.6 | 18.6 | 17.5 |
| 27.2 | 10.5 | 15.2 | 16.5 | 36.3 | 37.0 | 24.4 | 19.9 | 28.2 | 11.7 | -66.6 | 18.3 | 1.7 | 18.2 | 16.9 |
| 32.0 | 19.8 | 15.6 | 4.3 | 22.4 | 38.9 | 18.7 | 19.3 | 31.6 | 14.5 | -34.3 | 19.7 | 1.4 | 19.7 | 19.5 |
| 33.7 | 6.9 | 14.4 | 16.4 | 33.7 | 37.8 | 26.1 | 19.1 | 37.4 | 12.6 | -52.3 | 24.2 | 11.8 | 23.1 | 20.0 |
| 37.5 | 19.3 | 18.3 | 16.0 | 24.9 | 37.3 | 27.4 | 19.8 | 41.6 | 11.4 | -28.9 | 27.6 | 11.6 | 21.8 | 23.4 |
| 34.0 | 13.4 | 22.7 | 20.6 | 33.0 | 34.9 | 38.4 | 16.1 | 47.5 | 7.0 | -18.6 | 23.7 | 14.3 | 26.0 | 27.7 |
| 35.9 | 34.5 | 27.0 | 31.3 | 34.8 | 36.7 | 43.7 | 20.2 | 57.6 | 4.6 | 32.9 | 22.7 | 15.0 | 25.3 | 33.3 |
| 37.5 | 23.3 | 25.4 | 34.0 | 39.7 | 47.1 | 49.0 | 24.0 | 62.3 | 4.8 | -2.1 | 33.0 | 22.4 | 30.8 | 31.9 |
| 41.7 | 38.5 | 31.2 | 31.9 | 39.2 | 39.5 | 45.6 | 21.9 | 71.0 | 6.8 | 20.0 | 26.3 | 18.3 | 33.7 | 42.5 |
| 38.2 | 34.1 | 28.8 | 35.7 | 39.2 | 48.5 | 46.3 | 24.5 | 74.7 | 12.5 | -4.0 | 29.8 | 17.6 | 34.4 | 36.8 |
| 44.3 | 40.5 | 30.8 | 37.1 | 39.4 | 45.0 | 37.7 | 27.9 | 74.7 | 13.4 | 9.7 | 27.6 | 27.1 | 31.6 | 41.1 |
| 49.4 | 37.2 | 33.8 | 32.9 | 45.7 | 62.2 | 35.7 | 30.4 | 73.8 | 16.2 | -5.6 | 29.0 | 35.6 | 34.4 | 35.6 |
| 51.9 | 44.9 | 42.6 | 43.0 | 54.8 | 53.2 | 39.3 | 33.8 | 68.4 | 14.1 | 0.6 | 23.7 | 34.6 | 30.0 | 49.0 |
| 52.2 | 46.3 | 41.0 | 49.1 | 58.7 | 67.2 | 46.4 | 37.6 | 77.5 | 14.5 | -3.6 | 28.9 | 43.1 | 26.9 | 47.6 |
| 61.4 | 51.9 | 48.3 | 45.7 | 66.0 | 63.3 | 55.2 | 39.5 | 75.8 | 11.9 | 1.6 | 24.8 | 53.3 | 28.1 | 58.0 |
| 66.4 | 52.6 | 51.4 | 35.1 | 70.1 | 64.2 | 65.0 | 39.8 | 94.7 | 15.3 | -0.8 | 29.3 | 55.2 | 29.1 | 51.5 |
| 72.8 | 52.7 | 56.6 | 47.7 | 75.9 | 64.0 | 70.1 | 39.0 | 98.3 | 18.0 | -0.3 | 26.5 | 55.7 | 34.7 | 59.9 |
| 73.4 | 57.7 | 69.9 | 55.4 | 75.1 | 68.7 | 69.5 | 41.4 | 119.0 | 20.4 | -0.3 | 24.4 | 59.8 | 38.8 | 48.4 |
| 78.1 | 58.2 | 73.4 | 55.5 | 78.1 | 73.9 | 67.6 | 50.4 | 115.6 | 23.9 | -1.0 | 23.4 | 56.1 | 41.3 | 48.8 |
| 79.5 | 71.6 | 82.2 | 50.9 | 81.2 | 79.2 | 68.0 | 54.9 | 123.5 | 24.0 | -3.7 | 24.7 | 57.2 | 43.7 | 49.5 |
| 85.5 | 70.6 | 80.0 | 68.4 | 81.2 | 93.1 | 72.8 | 58.9 | 113.1 | 25.2 | -3.4 | 24.7 | 59.3 | 48.1 | 59.8 |
| 86.3 | 80.7 | 76.4 | 73.7 | 85.3 | 89.1 | 83.4 | 62.8 | 121.8 | 24.5 | -4.6 | 23.3 | 59.8 | 47.2 | 63.4 |
| 89.8 | 72.3 | 72.3 | 62.7 | 92.0 | 105.5 | 93.9 | 66.7 | 114.6 | 27.1 | -1.5 | 26.6 | 61.4 | 49.3 | 72.9 |
| 99.2 | 90.0 | 72.3 | 67.7 | 104.3 | 103.4 | 96.2 | 60.6 | 123.9 | 28.9 | -4.0 | 27.6 | 62.7 | 51.3 | 78.1 |
| 103.0 | 82.3 | 81.3 | 75.6 | 115.8 | 116.7 | 108.1 | 60.7 | 125.1 | 34.8 | -3.6 | 29.6 | 62.2 | 55.3 | 79.4 |
| 105.8 | 95.1 | 95.8 | 73.5 | 119.5 | 110.6 | 106.8 | 64.7 | 133.9 | 38.9 | -3.8 | 29.3 | 58.8 | 56.6 | 75.4 |
| 110.2 | 90.9 | 96.9 | 76.0 | 127.3 | 107.1 | 110.6 | 57.7 | 135.8 | 44.2 | -2.8 | 32.2 | 57.5 | 60.1 | 74.6 |
| 119.6 | 108.6 | 110.9 | 85.9 | 123.4 | 110.9 | 106.9 | 56.1 | 143.8 | 48.0 | -5.4 | 33.3 | 54.5 | 63.0 | 78.4 |
| 122.2 | 112.7 | 112.3 | 92.6 | 128.2 | 110.1 | 114.9 | 69.8 | 147.5 | 50.7 | -2.9 | 35.6 | 56.7 | 67.0 | 80.9 |
| 129.6 | 118.9 | 124.5 | 101.1 | 123.7 | 107.5 | 110.5 | 73.7 | 156.0 | 58.5 | -5.4 | 35.9 | 56.8 | 70.3 | 88.4 |
| 134.9 | 123.8 | 122.5 | 117.3 | 137.0 | 116.1 | 119.5 | 80.5 | 162.0 | 59.0 | -5.4 | 39.1 | 57.7 | 73.6 | 94.0 |
| 143.8 | 122.8 | 146.2 | 144.7 | 137.0 | 132.2 | 122.5 | 90.7 | 169.0 | 60.6 | -6.7 | 40.8 | 59.6 | 77.9 | 98.1 |
| 148.5 | 129.0 | 148.0 | 161.5 | 146.5 | 130.1 | 122.3 | 98.7 | 176.0 | 55.3 | -5.8 | 44.2 | 62.8 | 80.7 | 96.6 |
| 154.5 | 139.4 | 174.4 | 163.5 | 150.0 | 136.9 | 123.7 | 97.4 | 183.2 | 47.1 | -6.7 | 43.8 | 64.8 | 86.2 | 100.1 |
| 161.8 | 135.9 | -97.7 | 183.3 | 156.0 | 136.8 | 143.4 | 101.5 | 191.4 | 46.5 | -5.2 | 46.0 | 62.6 | 91.0 | 98.6 |
| 169.5 | 153.4 | -101.5 | 172.7 | 155.6 | 145.3 | 143.9 | 105.6 | 198.6 | 43.2 | -5.7 | 46.4 | 66.0 | 97.2 | 105.5 |

ThS1 = 0.14 m/s; ThS2 = 0.60 m/s
(Vr)max = (Vrad*q-VradF1*k)max      k= 1.15      q= 0.85(all-fire)      0.85(no-fire)

| Time | F8 | F7 | F6 | F5 | F41/2 | R2 | F21 | F31 | A3 | R4 | O3 | O21/2 | A2 | A6 | A11 |
|---|---|---|---|---|---|---|---|---|---|---|---|---|---|---|---|
| 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 1.25 | 0.28 | 0.17 | 0.00 | 0.12 | 0.07 | 0.50 | 0.00 | 0.00 | 0.10 | 0.29 | 0.50 | 0.50 | 0.07 | 0.17 | 0.13 |
| 2.50 | 0.83 | 0.65 | 0.14 | 0.38 | 0.23 | 0.85 | 0.06 | 0.17 | 0.53 | 0.84 | 0.72 | 0.82 | 0.28 | 0.27 | 0.32 |
| 3.75 | 0.97 | 1.03 | 0.42 | 0.78 | 0.36 | 0.85 | 0.25 | 0.17 | 0.53 | 0.84 | 0.72 | 0.82 | 0.28 | 0.27 | 0.32 |
| 5.00 | 0.97 | 1.03 | 0.58 | 0.78 | 0.36 | 0.85 | 0.25 | 0.17 | 0.53 | 0.84 | 0.72 | 0.82 | 0.28 | 0.27 | 0.32 |
| 6.25 | 0.97 | 1.03 | 0.58 | 0.78 | 0.36 | 0.85 | 0.25 | 0.17 | 0.53 | 0.84 | 0.72 | 0.82 | 0.28 | 0.27 | 0.32 |
| 7.50 | 0.97 | 1.03 | 0.58 | 0.78 | 0.36 | 0.85 | 0.25 | 0.17 | 0.53 | 0.84 | 0.72 | 0.82 | 0.28 | 0.27 | 0.32 |
| 8.75 | 0.97 | 1.03 | 0.58 | 0.78 | 0.36 | 0.85 | 0.25 | 0.17 | 0.65 | 0.84 | 0.72 | 0.82 | 0.28 | 0.27 | 0.32 |
| 10.00 | 0.97 | 1.03 | 0.58 | 0.78 | 0.81 | 0.85 | 0.25 | 0.17 | 0.65 | 0.84 | 0.72 | 0.82 | 0.28 | 0.44 | 0.32 |
| 11.25 | 0.97 | 1.03 | 0.58 | 0.78 | 0.81 | 0.85 | 0.25 | 0.17 | 0.65 | 0.84 | 0.72 | 0.82 | 0.28 | 0.44 | 0.32 |
| 12.50 | 0.97 | 1.03 | 0.58 | 0.78 | 0.81 | 0.85 | 0.25 | 0.17 | 0.65 | 0.84 | 0.72 | 0.82 | 0.28 | 0.44 | 0.32 |
| 13.75 | 1.20 | 1.38 | 0.58 | 0.78 | 0.81 | 0.85 | 0.25 | 0.17 | 0.65 | 0.84 | 0.72 | 0.82 | 0.28 | 0.44 | 0.32 |
| 15.00 | 1.52 | 1.61 | 0.58 | 0.78 | 0.81 | 0.85 | 0.25 | 0.17 | 0.65 | 0.84 | 0.72 | 0.82 | 0.28 | 0.44 | 0.32 |
| 16.25 | 1.52 | 2.37 | 0.58 | 0.78 | 0.81 | 0.85 | 0.25 | 0.17 | 0.65 | 0.84 | 0.72 | 0.82 | 0.28 | 0.85 | 0.32 |
| 17.50 | 1.52 | 2.57 | 0.58 | 0.78 | 0.81 | 0.96 | 0.25 | 0.17 | 0.65 | 0.84 | 0.72 | 0.82 | 0.28 | 0.85 | 0.32 |
| 18.75 | 1.52 | 2.57 | 0.58 | 1.14 | 0.81 | 1.46 | 0.25 | 0.17 | 0.65 | 0.84 | 0.72 | 0.82 | 0.32 | 0.85 | 0.32 |
| 20.00 | 1.52 | 2.57 | 0.58 | 1.16 | 0.81 | 1.73 | 0.25 | 0.17 | 0.65 | 0.84 | 0.72 | 0.82 | 0.32 | 0.85 | 0.32 |
| 21.25 | 1.52 | 2.57 | 0.58 | 1.16 | 0.81 | 2.22 | 0.25 | 0.17 | 0.77 | 0.84 | 0.72 | 0.82 | 0.45 | 1.02 | 0.32 |
| 22.50 | 1.52 | 2.57 | 0.58 | 1.36 | 0.81 | 2.70 | 0.25 | 0.54 | 1.46 | 0.84 | 0.72 | 0.82 | 1.16 | 1.02 | 0.32 |
| 23.75 | 1.52 | 2.57 | 0.58 | 1.36 | 0.81 | 2.70 | 0.25 | 0.54 | 1.46 | 0.84 | 0.72 | 0.82 | 1.16 | 1.02 | 0.32 |
| 25.00 | 1.52 | 2.57 | 0.58 | 1.53 | 0.81 | 2.70 | 0.25 | 0.54 | 1.53 | 0.84 | 0.72 | 0.82 | 1.42 | 1.02 | 0.32 |
| 26.25 | 1.52 | 2.57 | 0.58 | 1.80 | 0.81 | 2.70 | 0.25 | 0.54 | 2.31 | 0.84 | 0.72 | 0.82 | 1.46 | 1.02 | 0.32 |
| 27.50 | 1.52 | 2.57 | 0.58 | 1.99 | 0.81 | 2.70 | 0.25 | 0.54 | 2.31 | 0.84 | 0.72 | 0.82 | 1.46 | 1.02 | 0.32 |
| 28.75 | 1.52 | 2.57 | 0.58 | 2.27 | 0.81 | 2.70 | 0.25 | 0.54 | 2.31 | 0.84 | 0.72 | 0.82 | 1.46 | 1.02 | 0.32 |
| 30.00 | 1.52 | 2.57 | 0.58 | 2.27 | 0.81 | 2.70 | 0.25 | 0.54 | 2.31 | 0.84 | 0.72 | 0.82 | 1.46 | 1.02 | 0.32 |
| 31.25 | 1.52 | 2.57 | 0.58 | 2.27 | 0.94 | 2.70 | 0.25 | 0.67 | 2.31 | 0.84 | 0.72 | 0.82 | 1.46 | 1.02 | 0.32 |
| 32.50 | 1.52 | 2.57 | 0.58 | 2.27 | 1.01 | 2.70 | 0.25 | 1.53 | 2.84 | 0.84 | 0.72 | 0.82 | 1.48 | 1.02 | 0.32 |
| 33.75 | 1.52 | 2.57 | 0.58 | 2.27 | 1.01 | 2.70 | 0.25 | 1.53 | 2.92 | 0.84 | 0.72 | 0.82 | 1.48 | 1.02 | 0.60 |
| 35.00 | 1.52 | 2.57 | 0.58 | 2.27 | 1.01 | 2.70 | 0.25 | 1.53 | 3.58 | 0.84 | 0.72 | 0.82 | 1.96 | 1.02 | 1.28 |
| 36.25 | 1.52 | 2.57 | 0.58 | 2.27 | 1.01 | 2.70 | 0.25 | 1.53 | 3.58 | 0.84 | 0.72 | 0.82 | 1.96 | 1.02 | 1.28 |
| 37.50 | 1.52 | 2.57 | 0.58 | 2.27 | 1.01 | 2.70 | 0.25 | 1.53 | 3.58 | 0.84 | 0.72 | 0.82 | 1.96 | 1.02 | 1.28 |
| 38.75 | 1.52 | 2.57 | 0.58 | 2.27 | 1.01 | 2.70 | 0.25 | 1.53 | 3.58 | 0.84 | 0.72 | 0.82 | 1.96 | 1.02 | 1.28 |
| 40.00 | 1.52 | 2.57 | 0.58 | 2.27 | 1.01 | 2.70 | 0.26 | 1.53 | 3.58 | 0.84 | 0.72 | 0.82 | 1.96 | 1.02 | 1.28 |
| 41.25 | 1.52 | 2.57 | 0.58 | 2.27 | 1.01 | 2.70 | 0.47 | 1.53 | 3.58 | 0.84 | 0.86 | 0.82 | 1.96 | 1.02 | 1.28 |
| 42.50 | 1.52 | 2.57 | 0.58 | 2.27 | 1.01 | 2.70 | 0.47 | 1.53 | 3.58 | 0.84 | 0.90 | 0.82 | 1.96 | 1.02 | 1.28 |
| 43.75 | 1.52 | 2.57 | 0.58 | 2.27 | 1.01 | 2.70 | 0.47 | 1.53 | 3.58 | 0.84 | 1.39 | 0.82 | 1.96 | 1.02 | 1.28 |
| 45.00 | 1.52 | 2.57 | 0.58 | 2.27 | 1.01 | 2.70 | 0.47 | 1.53 | 3.58 | 0.84 | 1.64 | 0.82 | 1.96 | 1.02 | 1.28 |
| 46.25 | 1.52 | 2.57 | 0.58 | 2.27 | 1.01 | 2.70 | 0.47 | 1.53 | 3.58 | 0.84 | 1.67 | 0.82 | 1.96 | 1.02 | 1.28 |
| 47.50 | 1.52 | 2.57 | 0.58 | 2.27 | 1.01 | 2.70 | 0.47 | 1.53 | 3.58 | 0.84 | 1.67 | 0.82 | 1.96 | 1.02 | 1.28 |
| 48.75 | 1.52 | 2.57 | 0.58 | 2.27 | 1.01 | 2.70 | 0.47 | 1.53 | 3.58 | 0.84 | 1.67 | 0.82 | 1.96 | 1.02 | 1.28 |
| 50.00 | 1.52 | 2.57 | 0.58 | 2.27 | 1.01 | 2.70 | 0.47 | 1.53 | 3.58 | 0.84 | 1.67 | 0.82 | 1.96 | 1.03 | 1.28 |
| Results | 8/8 | 8/8 | 9/0 | 10/10 | 10/10 | 14/14 | 10/0 | 14/0 | 16/16 | 29/29 | 21/21 | 23/23 | 20/23 | 28/28 | 23/0 |
| Required | 10/15 | 11/16 | 16/21 | 18/23 | 19/24 | 20/25 | 21/0 | 21/0 | 24/29 | 24/29 | 25/30 | 28/33 | 28/33 | 28/33 | 30/0 |

All-fire and no-fire events of a given vehicle: -15% Variation
Case - Time vs. POM, ThD = 66 mm

| P3 | A5 | O11 | P4 | E2 | P2 | O41/2 | O5 | A41 | P11/2 | No-Fire Events ||||||| 
|---|---|---|---|---|---|---|---|---|---|---|---|---|---|---|---|---|
| | | | | | | | | | | F1 | E1 | E3 | E4 | E5 | R1 | R3 |
| 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 0.00 | 0.12 | 0.21 | 0.00 | 0.50 | 0.44 | 0.00 | 0.00 | 0.10 | 0.03 | 0.00 | 0.01 | 0.00 | 0.50 | 0.01 | 0.08 | 0.00 |
| 0.23 | 0.20 | 0.41 | 0.28 | 1.05 | 0.73 | 0.04 | 0.00 | 0.10 | 0.58 | 0.00 | 0.01 | 0.44 | 1.06 | 0.04 | 0.08 | 0.00 |
| 0.66 | 0.26 | 0.41 | 0.42 | 1.49 | 0.73 | 0.24 | 0.00 | 0.10 | 0.58 | 0.00 | 0.01 | 0.44 | 1.46 | 0.04 | 0.08 | 0.00 |
| 0.66 | 0.26 | 0.41 | 0.42 | 1.66 | 0.73 | 0.28 | 0.00 | 0.10 | 0.58 | 0.00 | 0.01 | 0.44 | 1.46 | 0.04 | 0.08 | 0.00 |
| 0.66 | 0.26 | 0.41 | 0.42 | 2.19 | 0.73 | 0.28 | 0.04 | 0.10 | 0.58 | 0.00 | 0.01 | 0.44 | 1.46 | 0.04 | 0.08 | 0.00 |
| 0.66 | 0.26 | 0.41 | 0.42 | 2.21 | 0.73 | 0.28 | 0.37 | 0.10 | 0.58 | 0.00 | 0.01 | 0.44 | 1.62 | 0.04 | 0.08 | 0.00 |
| 0.66 | 0.26 | 0.41 | 0.42 | 2.21 | 0.73 | 0.28 | 0.37 | 0.10 | 0.58 | 0.00 | 0.01 | 0.44 | 1.73 | 0.04 | 0.08 | 0.00 |
| 0.66 | 0.26 | 0.41 | 0.42 | 2.21 | 0.73 | 0.28 | 0.37 | 0.10 | 0.58 | 0.00 | 0.01 | 0.44 | 1.73 | 0.04 | 0.08 | 0.00 |
| 0.66 | 0.26 | 0.41 | 0.42 | 2.21 | 0.73 | 0.28 | 0.37 | 0.10 | 0.58 | 0.00 | 0.01 | 0.44 | 1.73 | 0.04 | 0.08 | 0.00 |
| 0.66 | 0.26 | 0.41 | 0.42 | 2.21 | 0.73 | 0.28 | 0.37 | 0.10 | 0.58 | 0.00 | 0.01 | 0.44 | 1.73 | 0.04 | 0.08 | 0.00 |
| 0.66 | 0.26 | 0.41 | 0.42 | 2.21 | 0.73 | 0.28 | 0.37 | 0.10 | 0.58 | 0.00 | 0.01 | 0.44 | 1.73 | 0.04 | 0.08 | 0.00 |
| 0.66 | 0.26 | 0.41 | 0.42 | 2.21 | 0.73 | 0.28 | 0.37 | 0.10 | 0.58 | 0.00 | 0.01 | 0.44 | 1.73 | 0.04 | 0.08 | 0.00 |
| 0.92 | 0.26 | 0.41 | 0.42 | 2.21 | 1.47 | 0.28 | 0.37 | 0.10 | 0.58 | 0.00 | 0.01 | 0.44 | 1.73 | 0.04 | 0.08 | 0.00 |
| 0.92 | 0.26 | 0.41 | 0.42 | 2.21 | 1.59 | 0.28 | 0.37 | 0.10 | 0.58 | 0.00 | 0.01 | 0.44 | 1.73 | 0.04 | 0.08 | 0.00 |
| 0.92 | 0.29 | 0.41 | 0.42 | 2.21 | 2.04 | 0.28 | 0.37 | 0.10 | 0.58 | 0.00 | 0.01 | 0.44 | 1.73 | 0.04 | 0.08 | 0.00 |
| 0.92 | 0.29 | 0.41 | 0.60 | 2.21 | 2.04 | 0.28 | 0.37 | 0.10 | 0.58 | 0.00 | 0.01 | 0.44 | 1.73 | 0.04 | 0.08 | 0.00 |
| 0.92 | 0.29 | 0.41 | 1.08 | 2.21 | 2.04 | 0.34 | 0.37 | 0.10 | 0.58 | 0.00 | 0.01 | 0.44 | 1.73 | 0.04 | 0.08 | 0.00 |
| 0.92 | 0.29 | 0.41 | 1.66 | 2.21 | 2.19 | 0.34 | 0.37 | 0.10 | 0.96 | 0.00 | 0.01 | 0.44 | 1.73 | 0.04 | 0.08 | 0.00 |
| 0.92 | 0.29 | 0.41 | 1.66 | 2.21 | 2.19 | 0.34 | 0.37 | 0.10 | 0.96 | 0.00 | 0.01 | 0.44 | 1.73 | 0.04 | 0.08 | 0.00 |
| 0.92 | 0.29 | 0.41 | 1.66 | 2.21 | 2.19 | 0.34 | 0.37 | 0.10 | 0.96 | 0.00 | 0.01 | 0.44 | 1.73 | 0.04 | 0.08 | 0.00 |
| 0.92 | 0.74 | 0.41 | 1.66 | 2.21 | 2.19 | 0.34 | 0.38 | 0.10 | 0.96 | 0.00 | 0.01 | 0.44 | 1.73 | 0.04 | 0.08 | 0.00 |
| 1.07 | 1.03 | 0.41 | 1.66 | 2.21 | 2.19 | 0.34 | 0.69 | 0.10 | 0.96 | 0.00 | 0.01 | 0.44 | 1.73 | 0.04 | 0.08 | 0.00 |
| 1.07 | 1.30 | 0.41 | 1.66 | 2.21 | 2.19 | 0.34 | 0.69 | 0.10 | 0.96 | 0.00 | 0.01 | 0.44 | 1.73 | 0.04 | 0.08 | 0.00 |
| 1.07 | 1.36 | 0.41 | 1.66 | 2.21 | 2.19 | 0.34 | 1.09 | 0.10 | 0.96 | 0.00 | 0.01 | 0.44 | 1.73 | 0.04 | 0.08 | 0.00 |
| 1.07 | 1.36 | 0.41 | 1.66 | 2.21 | 2.19 | 0.34 | 1.57 | 0.10 | 0.96 | 0.00 | 0.01 | 0.44 | 1.73 | 0.04 | 0.08 | 0.00 |
| 1.07 | 1.36 | 0.41 | 1.66 | 2.21 | 2.19 | 0.36 | 2.15 | 0.10 | 0.96 | 0.00 | 0.01 | 0.44 | 1.73 | 0.04 | 0.08 | 0.00 |
| 1.07 | 1.59 | 0.41 | 1.66 | 2.21 | 2.19 | 1.01 | 2.42 | 0.10 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.10 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.10 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.10 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.10 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.10 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.10 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.10 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.10 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.15 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.15 | 0.96 | 0.00 | 0.01 | 0.44 | 1.73 | 0.04 | 0.08 | 0.00 |
| 1.07 | 2.04 | 0.41 | 1.66 | 2.21 | 2.19 | 1.01 | 2.42 | 0.15 | 0.96 | 0.00 | 0.01 | 0.44 | 1.73 | 0.04 | 0.08 | 0.00 |
| 34/34 | 30/30 | 27/0 | 31/31 | 29/29 | 33/33 | 25/0 | 28/28 | 48/0 | 41/41 | nd | nd | nd | nd | nd | nd | nd |
| 30/35 | 31/36 | 33/0 | 33/38 | 33/38 | 35/40 | 36/0 | 36/41 | 39/0 | 43/48 | nd | nd | nd | nd | nd | nd | nd |

FIG. 9B

VEHICLE SENSING SYSTEM USING BIASED SEVERITY MEASURE

TECHNICAL FIELD

This invention relates to sensing systems for road vehicles and more particularly it relates to an improved system especially adapted for a dual-stage airbag system with a biased severity measure.

BACKGROUND OF THE INVENTION

It is already known in the prior art to provide occupant protection systems in road vehicles using airbags having two or more stages of inflation so that the level of inflation is deployed in accordance with the severity of the crash event.

In U.S. Pat. No. 5,999,871 granted to Liu Dec. 7, 1999, a system and method is disclosed for firing airbag inflators simultaneously or in succession to optimize the effect of the airbag for different types of crash at different impact speeds. In this method, the first one of the inflators is triggered by a control algorithm which evaluates the severity of the crash to determine whether to deploy the airbag and when to fire the inflator. In making this determination, the controller detects when vehicle acceleration reaches a threshold, then invokes the deployment algorithm which calculates a deployment time and a velocity change at the deployment time determined by integrating the acceleration. The algorithm for the second stage then evaluates severity of the crash on the basis of the deployment time and velocity at the deployment time. In the case of a very severe crash, the second inflator is fired immediately. For a moderately severe crash, the second inflator is fired after a time delay which is a function of the first stage deployment time and/or the velocity at the first stage deployment time. For a less severe crash, the second inflator is not fired at all. If the system has an additional inflator, the same logic is used to determine its firing based on the deployment time of the second inflator and the velocity at that time. Thus, the system re-determines crash severity as of the time of the inflating of the second stage and deploys the additional inflator when justified by the re-determined crash severity.

U.S. Pat. No. 5,969,599 to Wessels et al. granted Oct. 19, 1999 discloses a method of airbag deployment for occupant protection in a crash event. In this method, deployment is initiated when a filtered version of an acceleration signal exceeds a deployment threshold that is periodically adjusted based on one or more secondary measures of crash severity and the level of event progression. The event progression level is based on the value of a filtered acceleration signal relative to one or more predefined event progression thresholds. The deployment threshold is set to a relatively high default level during periods of inactivity to provide good immunity to rough road impacts while providing timely deployment for high speed crash events; it is periodically adjusted from the default level in the course of a crash event. The level of event progression is determined by deriving a delta-velocity signal biased toward zero, and comparing such signal to a set of predefined event progression thresholds. At each level or stage of the event progression, the deployment threshold is adjusted within predefined boundaries based on one or more secondary measures of crash severity. Threshold adjustments based on each of the secondary measurements are weighted and accumulated to determine the net threshold adjustments.

Watanabe et al. Pat. No. 5,787,377 granted Jul. 28, 1998 describes an airbag ignition timing system which processes vehicle acceleration signals to predict when a passenger's head will reach a front surface of the airbag. The ignition timing circuit processes acceleration signals to obtain plural displacement signals and adds them together to derive a predicted displacement signal and compare it with a reference value. An ignition signal is issued in the event the predicted displacement signal exceeds the reference value. In this system, predicted occupant displacement and crash severity are processed in a parallel manner as distinguished from a sequential manner.

SUMMARY OF THE INVENTION

In accordance with this invention, a crash sensing algorithm is disclosed for a dual stage airbag system which is especially adapted for setting the degree of robustness or sensitivity of the crash sensing system. This is accomplished by using a crash severity measure, referred to herein as a biased severity measure, to determine no deployment, single-deployment or two-stage deployment of an airbag. Preferably, the biased severity measure uses a bias factor to make a chosen severity measure in favor of robustness or sensitivity, as desired.

Further, in accordance with this invention, the crash sensing algorithm uses a predicted occupant movement which must reach a preset occupant movement threshold before the value of the biased severity measure is compared with first and second severity thresholds for determining actuation of the first and second stage deployment of the airbags.

A complete understanding of this invention may be obtained from the detailed description that follows taken with the accompanying drawings.

DESCRIPTION OF THE DRAWINGS

FIG. 6 is a table showing all-fire and no-fire events of a given vehicle in a plot of time versus predicted occupant movement with a positive bias factor for the biased severity measure;

Figure 1:
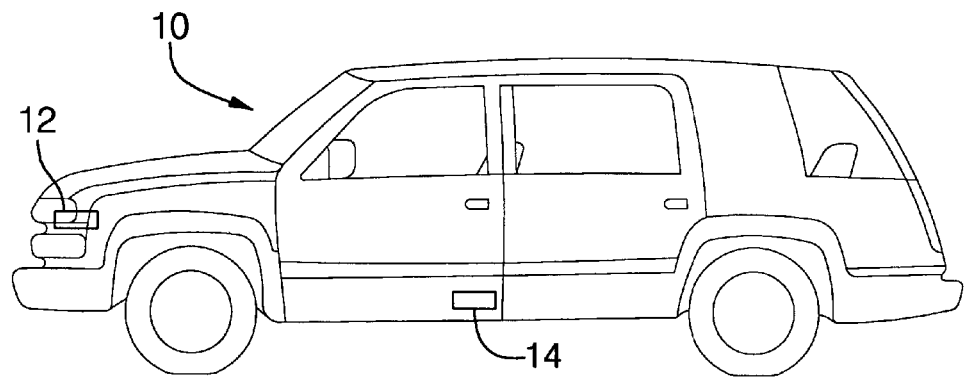
FIG. 1 is a diagrammatic representation of a road vehicle showing typical location of certain crash sensors.

Referring now to the drawings, there is shown an illustrative embodiment of the invention in an occupant protection system having a dual-stage airbag in which the inflators are triggered under the control of a crash sensing algorithm which employs a crash severity measure to determine no-deployment, single stage deployment or double stage deployment of an airbag. A crash severity measure referred to as a biased severity measure (BSM), uses a bias factor k to bias a selected severity measure in favor of the robustness or in favor of sensitivity of the sensing algorithm, as desired. It will be appreciated, as the description proceeds, that the invention will be useful in various applications and may be realized in a wide variety of embodiments.

DESCRIPTION OF THE PREFERRED EMBODIMENT

Referring now to the drawings, FIG. 1 depicts the location of crash sensors in a typical vehicle installation. As shown, the vehicle 10 is provided with a remote accelerometer 12 which is mounted at the center of the radiator-tie-bar at the front end of the vehicle for sensing velocity changes at the radiator-tie-bar. The vehicle is also provided with an SDM accelerometer 14 which is located underneath the passenger seat as a part of the signal and diagnostic module (SDM) of the vehicle crash sensing system. The vehicle crash sensing system detects and discriminates severe crash events from minor crash incidents by signals derived from accelerometers 12 and 14. Such derived signals are used in the signal processing algorithm of this invention which is implemented in the control program of the microcontroller of the crash sensing system. As discussed above, the sensing algorithm relies only on velocity-based measures which are derived from the acceleration signals generated by the accelerometers 12 and 14 which will be described below. Thus, the calibration of the crash sensing system may be calibrated using finite element analysis (FEA) instead of crash-testing of prototype vehicles. As discussed above, the FEA simulation shows good comparison with the crash testing provided that the sensing algorithm uses velocity-based measures.

Figure 2:
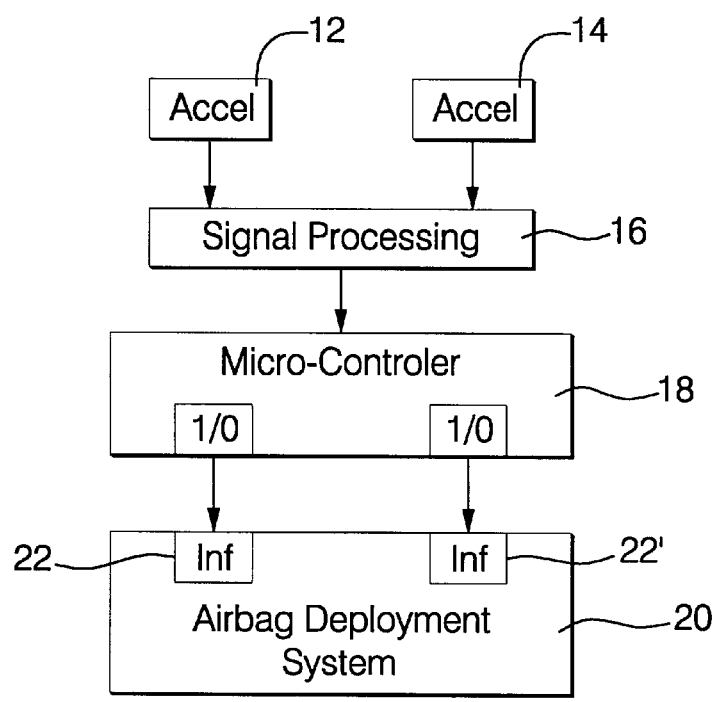
FIG. 2 is a block diagram of a vehicle occupant protection system with dual-stage airbag system.

FIG. 2 shows the occupant protection system which comprises the accelerometer 12 and the accelerometer 14 which are coupled through a signal processing circuit 16 to a microcontroller 18. An airbag deployment system 20 is coupled with the output of the microcontroller and is controlled thereby. Except for the functional operation of the microcontroller, the structure and function of each of the components just described is conventional and well-known in the art. However, the microcontroller 18 performs its functionality under program control of imbedded software which executes control over the deployment system in accordance with the logic represented by the algorithm of this invention which will be described below.

The airbag deployment system 20 comprises a first stage inflator 22 and a second stage inflator 22' which are controlled by the microcontroller 18 to inflate the airbag in different stages, i.e. at different times. Each of the first and second inflators, when ignited, partially inflates the airbag and both inflators together, when fired simultaneously or in succession, fully inflates the airbag. Thus, the partially or fully inflated airbag can be deployed immediately by simultaneous ignition or a full inflation of the airbag is produced over a longer period of time by deployment in successive stages. Each of the inflators 22 and 22' is coupled with an input/output port 20 of the microcontroller 18.

Figure 3:
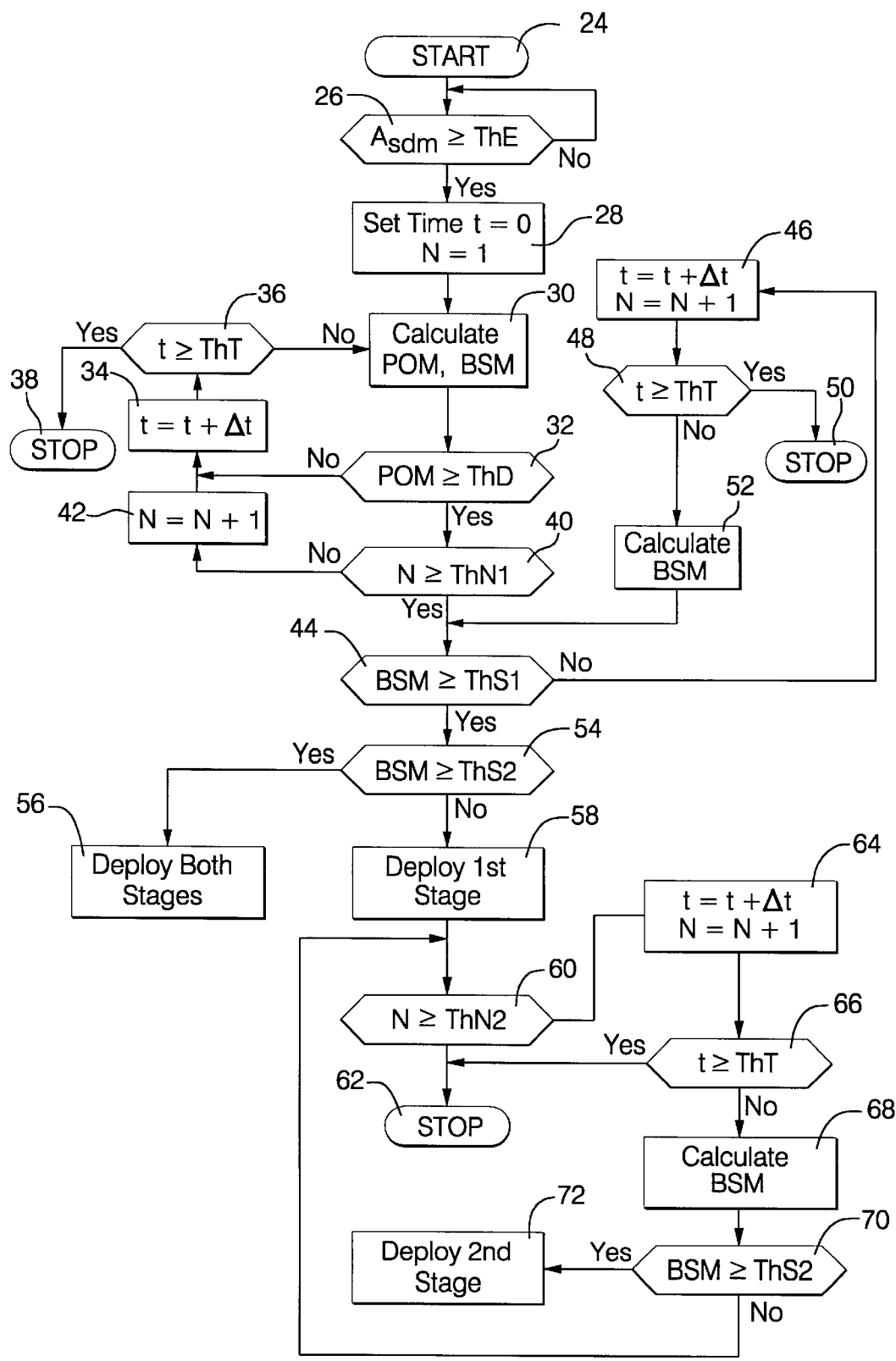
FIG. 3 is a flow chart representing the algorithm of this invention which is imbedded in the computer program of the microcontroller.

FIG. 3 is a flow chart which represents the deployment algorithm of this invention which is implemented in the control program of the microcontroller 18.

The sensing algorithm in the illustrative embodiment of the invention is initiated when the acceleration $A_{sdm}$ exceeds a threshold ThE equal to 2 g. Upon initiation, the lapsed event time t is set to zero and the loop count N is set to one. If the calculated value of predicted occupant movement POM at elapsed time t is equal to or greater than the movement threshold ThD then the biased severity measure BSM at time t is compared with the first severity threshold ThS1. In order to improve the robustness of the algorithm in the illustrative embodiment, the loop count threshold ThN1 is set to two which requires the predicted occupant movement POM to exceed the threshold twice.

Three possible decisions are to be made by the algorithm regarding actuation of the airbag inflators based upon the value and value changes of the biased severity measure BSM. (1) If the biased severity measure BSM at the time t is equal to or greater than the first threshold ThS1 and the second threshold ThS2 both stages of the airbag will be activated at the time t. (2) If the value of the biased severity measure is equal to or greater than the first threshold ThS1 but less than the second threshold ThS2 then only the first stage of the airbag will be activated at time t. In this case however, the sensing algorithm will continue to monitor the bias severity measure value for a predetermined period of time. The second stage inflator will be triggered if the value of BSM is equal to or greater than the second threshold ThS2 during this period of time. (3) If the value of a biased severity measure BSM at the time t is not equal to or greater than the first threshold ThS1 the algorithm will continue monitoring the value of BSM until it is equal to or greater than the threshold ThS1 or the second threshold ThS2 to determine whether to deploy a single stage or a dual stage airbag. Whenever the event time t exceeds a predetermined time threshold ThT, the sensing event will be reset to a start block 24. If desired, a time delay after a reset may be incorporated into the sensing algorithm to improve the robustness to some minor non-deployment events.

The microcontroller is programmed to process the flow chart loop periodically at a given frequency such as 2000 Hertz to repeatedly access the acceleration signal produced by the accelerometers 12 and 14. The program has a start block 24 which initializes the computer program when the vehicle is started. In this description of the sensing algorithm the preset value of each parameter used in this example will be given in parentheses at appropriate places after mention of the parameter. The deployment algorithm uses the acceleration signals $A_{sdm}$ from the SDM accelerometer 12 to enable operation of the crash sensing system. The sensing system is enabled by the test block 26 which determines whether the acceleration of the vehicle $A_{sdm}$ is equal to or greater than a predetermined acceleration threshold ThE, (e.g. 2 g). If $A_{sdm}$ is not greater than the threshold, the program loops back to the input of test block 24; if it is greater, the program advances to a settings block 28 which sets the time t to zero and sets the loop count N to one. Then the program advances to a calculation block 30 which calculates the values of predicted occupant movement POM and the biased severity measure BSM.

The predicted occupant movement POM is calculated in accordance with equation (1) as follows:

$$POM = S_{sdm} + V_{sdm} t_d + \tfrac{1}{2} a_d t_d^2 \qquad (1)$$

at time $t+t_d$, where:

$S_{sdm}$=vehicle displacement at time t,

Vsdm=vehicle velocity change at time t, td=required airbag inflation time $a_d$=average acceleration obtained from averaging a finite duration of measured accelerations prior to the time t.

t=event time measured from the threshold crossing by $A_{sdm}$.

The biased severity measure VSM is calculated in accordance with equation (2) as follows:

$$BSM = MAX[V_{rad} - k(V_{radF1})] \quad (2)$$

where:

$V_{rad}$=velocity changes at the Location of the remote accelerometer,

VradF1=a reference value equal to Vrad in a no-fire impact test event at a given speed k=a selected bias factor for biasing the algorithm MAX denotes that BSM is the maximum value achieved by the bracketed quantity.

The program advances from calculation block 30 to test block 32 which determines whether the predicted occupant movement POM is equal to or greater than the movement threshold ThD. If it is not, the program loops back to an incrementing block 34 which increments time t by Δt (e.g. 1.25 msec), the time step of the sensing algorithm. Then, the program proceeds to test block 36 which determines whether the time t is equal to or greater than a preset time limit threshold ThT (e.g. 50 msec). If it is greater than ThT, the program is reset at stop block 38; if it is not, the program proceeds from test block 36 to the calculation block 30 which re-calculates the values of the predicted occupant movement POM and the biased severity measure BSM at the event time t in accordance with equations (1) and (2).

If at test block 32 the predicted occupant movement POM is equal to or greater than the movement threshold ThD (e.g. 66 mm), the program advances to test block 40 which determines whether the loop count N is equal to or greater than the preset loop count threshold ThN1 (e.g. 2). If N is not two or greater, the program loops back from test block 38 to the loop count increment block 42 which increments the value of N by 1. From block 42, the program loops back to block 34 which again increments the time by the time step Δt and the program proceeds to test block 36 to determine whether t is equal to or greater than the threshold ThT; if it is not, the program proceeds to block 30 which calculates the predicted occupant movement POM and the biased severity measure BSM and then advances to the test block 32 to determine whether POM is greater than the threshold; if it is not, the program loops back again but if it is, the program advances to test block 40 to determine whether the loop count N is equal to or greater than the threshold ThN1. If it is not, the program loops back as before; if it is, the program advances to test block 44.

Test block 44 determines whether the biased severity measure BSM is equal to or greater than the severity measure threshold ThS1 (e.g. 0.14 m/s). If it is not, the program proceeds to incrementing block 46 which increments the time t by Δt and which also increments the loop count N by one. From the incrementing block 46, the program proceeds to a test block 48 which determines whether the event time is equal to or greater than the time threshold ThT. If it is, the program proceeds to the stop block 50 which resets the program to the start block 24; if not, the program proceeds to a calculation block 52 which calculates the biased severity measure BSM at the event time t in accordance with equation (2). Then, the program advances to test block 44 which determines whether the biased severity measure BSM is equal to or greater than the severity threshold ThS1. If it is not, the program loops back through blocks 46, 48 and 52 to test block 44 again, unless the program is reset at stop block 50. If at test block 44, the biased severity measure BSM is equal to or greater than the first severity threshold ThS1 the program advances to test block 54 to determine whether BSM is equal to or greater than a second severity threshold ThS2 (e.g. 0.6 m/s). If it is, the program advances to actuation block 56 which fires the igniters of both inflators 22 and 22' to deploy both stages of the airbag simultaneously; if it is not, the program advances to actuation block 58 which fires the igniter of inflator 22 only to deploy the first stage.

The program then advances to test block 60 to determine whether the loop count N is equal to or greater than the threshold ThN2 (e.g. 7). If it is, the program advances to the stop block 62 and the program is reset; if it is not, the program proceeds to incrementing block 64 which increments the sensing time by Δt and increments the loop count by one. Then the program proceeds to test block 66 which determines whether the elapsed event time t is equal to or greater than the time threshold ThT. If it is, the program proceeds to the stop block 62 and is reset; if it is not, the program advances to the calculation block 68 which calculates the biased severity measure BSM at the elapsed event time t and then proceeds to test block 70 which determines whether the biased severity measure BSM is equal to or greater than the second severity threshold ThS2. If it is not, the program loops back to test block 60 and then, depending on the loop count, proceeds to either the stop block 62 or to the incrementing block 64 as described above. From the incrementing block 64, the program advances to the test block 66 and then, depending upon the elapsed time, proceeds to either stop block 62 or the calculation block 68 and thence to the test block 70. The program continues monitoring the biased severity measure BSM in this loop until either the loop count N or time t exceeds its threshold or until BSM exceeds the second threshold ThS2. If at block 70 the biased severity measure BSM is equal to or greater than the threshold ThS2 the program advances to the actuation block 72 which fires the second stage inflator 22'.

FIGS. 4–9 illustrate the application of the sensing algorithm to various deployment and no-deployment events of a given vehicle within a plus or minus fifteen percent variation tolerance, i.e. where the value of the bias factor k is chosen at +1.15 in the illustrative embodiment to bias the algorithm in favor of robustness for the no-deployment case. Other parameters used in the illustrative embodiment are as follows:

ThE=2 g, ThN1=2, ThN2=7, ThT=50 msec, Δt=1.25 msec (Δt denotes the time step of the sensing algorithm, $t_d$=30 msec, ThD=66 mm, ThS1=0.14 m/s, and ThS2=0.6 m/s.

FIGS. 4–9 are tables of selected velocity-based measures for 32 different crash events which are used for calibrating vehicle crash sensing systems. Each of these Figures identifies the different crash events with alphanumeric names F1, F2, A1, etc. of the events.

Figures 4, 4A:
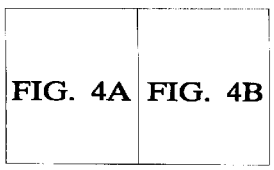
FIG. 4 is a table showing all-fire and no-fire events of a given vehicle in a plot of time versus predicted occupant movement in various crash events.

FIG. 4 is a table of time versus predicted occupant movement POM calculated in accordance with equation (1) above for each of the crash events for a nominal case with a bias factor k equal to one and a movement threshold equal to 66 mm. The first column of the table (labelled "Time") shows the time in milliseconds which has elapsed event time after the occurrence of the threshold ThE. The remaining columns are labelled with numbers 1 through 32 and each such column contains values of predicted occupant movement (POM) for the particular crash event of the same vehicle. Each of the columns 1 through 32 contains data for a particular test event which is identified by its alphanumeric name such as F8, F7 R2, etc. For example, column 1 in FIG. 4 contains data for test event F8 which is a vehicle crash at 35.0 mph with a frontal barrier at zero degrees. Likewise, columns 2 through 32 contain data for the different crash events for the same vehicle. In the chart of FIG. 4, the crash events listed in columns 1–25 are grouped under the title "All-Fire Events" and the events listed in columns 26–32 are grouped under the title "No-Fire Events". The All-Fire Events are those in which the airbag is inflated with either a single stage inflation, indicated by a superscript "1" on the alphanumeric name, or with a single or dual stage inflation which are indicated by a superscript "1/2" and those events which have no superscript are a dual stage inflation. There is no inflation of the airbags in the crash events in columns 26 through 32. In the table of FIG. 4, the value of threshold ThD is 66 mm. As shown in the table of FIG. 4 for crash event F8, the first occurrence of the POM becoming equal to or greater than the threshold is at 6.3 msec and the second occurrence is at 7.5 msec.

Figures 5, 5A:
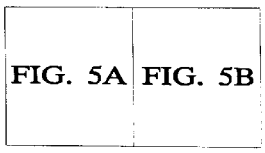
FIG. 5 is a table showing all-fire and no-fire events of a given vehicle in a plot of time versus biased severity measure data of various crash events.

FIG. 5 is a table of time versus biased severity measure BSM calculated in accordance with equation (2) above for each of the crash events for a nominal case with a bias factor k equal to 1.15 and a severity threshold ThS1 equal to 0.14 m/s and ThS2 equal to 0.6 m/s. In the example shown in FIG. 5 for the F8 crash event, the unbiased severity measure first becomes equal to or greater than the first threshold ThS1 at 1.25 msec and first becomes equal or greater than the second threshold ThS2 at 2.50 msec.

FIG. 6 is a table of time versus predicted occupant movement POM calculated in accordance with equation (1) above for the case of crash events +15 percent variation and with a bias factor k equal to 1.15 and a movement threshold equal to 66 mm. This shows the effect of the positive bias factor k relative to the nominal case of the bias factor of one shown in FIG. 4. As shown in the table of FIG. 6 for crash event F8, the first occurrence of the POM becoming equal to or greater than the threshold is at 6.3 msec and the second occurrence is at 7.5 msec.

Figures 7, 7A:
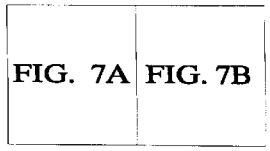
FIG. 7 is a table showing all-fire and no-fire events of a given vehicle in a plot of time versus biased severity measure data with a positive bias factor for the biased severity measure.

FIG. 7 is a table of time versus biased severity measure BSM calculated in accordance with equation (2) above for the case of crash events with +15 percent variation and a bias factor k equal to 1.15 and a severity threshold of ThSl equal to 0.14 m/s and ThS2 equal to 0.6 m/s. In the example shown in FIG. 7 for the F8 crash event, the biased severity measure first becomes equal to or greater than the first threshold ThS1 at 1.25 msec and first becomes equal to or greater than the second threshold ThS2 at 2.50 msec.

Figures 8, 8A:
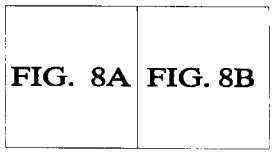
FIG. 8 is a table showing all-fire and no-fire events of a given vehicle in a plot of time versus predicted occupant movement with a negative bias factor for the biased severity measure.

FIG. 8 is a table of time versus predicted occupant movement POM calculated in accordance with equation (1) above for the case of crash events with −15 percent variation and a bias factor k equal to 1.15 and a movement threshold equal to 66 mm. As shown in the table of FIG. 8 for crash event F8, the first occurrence of the POM becoming equal to or greater than the threshold is at 6.3 msec and the second occurrence is at 7.5 msec.

Figures 9, 9A:
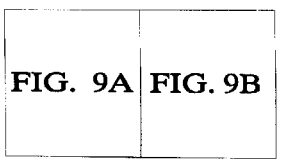
FIG. 9 is a table showing all-fire and no-fire events of a given vehicle in a plot of time versus biased severity measure with a negative bias factor for the biased severity measure.

FIG. 9 is a table of time versus biased severity measure BSM calculated in accordance with equation (2) above for the case of crash events with −15 percent variation and a bias factor k equal to 1.15 and a severity threshold ThS1 equal to 0.14 m/s and ThS2 equal to 0.6 m/s. In the example shown in FIG. 9 for the F8 crash event, the unbiased severity measure first becomes equal to or greater than the first threshold ThS1 at 1.25 msec and first becomes equal to or greater than the second threshold ThS2 at 2.5 msec.

Although the description of this invention has been given with reference to particular embodiments, it is not to be construed in a limiting sense. Many variations and modifications will now occur to those skilled in the art. For a definition of the invention, reference is made to the appended claims.

I claim:

1. A method of controlling deployment of an airbag in a vehicle, said airbag having first and second stages of deployment, said method comprising the steps of:

sensing vehicle acceleration as an indication of a crash event, initiating a deployment algorithm and initiating measurement of event time when the sensed acceleration exceeds a threshold, calculating a predicted occupant movement which will occur during the event time plus a predetermined time duration, calculating a biased severity measure indicative of the severity of the crash event, said biased severity measure being a function of vehicle velocity relative to an adjusted reference value of vehicle velocity, if the predicted occupant movement is equal to or greater than a predetermined movement threshold and if the biased severity measure is equal to or greater than predetermined first and second severity thresholds, activating the first and second stages of deployment of the airbag, or if the predicted occupant movement is equal to or greater than the movement threshold and if the biased severity measure is equal to or greater than the first severity threshold but less than the second severity threshold, activating only the first stage of the airbag; and if the biased severity measure is equal to or greater than the second severity threshold within a predetermined time interval, activating the second stage of the airbag, or if the predicted occupant movement is equal to or greater than the movement threshold and if the biased severity measure is less than the first severity threshold, recalculating the biased severity measure one or more times during a predetermined time period and activating the first stage of the airbag if the biased severity measure becomes equal to or greater than the first threshold during that predetermined time period, and activating the second stage of the airbag if the biased severity measure becomes equal to or greater than the second threshold within the predetermined time period, and resetting the measurement of the event time whenever it exceeds a predetermined time threshold.

2. The method as defined by claim 1 wherein said biased severity measure is calculated in accordance with the expression:

$$BSM = \mathrm{MAX}[V_{rad} - k(V_{radF1})]$$

where:

$V_{rad}$=velocity changes at the location of the remote accelerometer, $V_{radF1}$=a reference value equal to Vrad in a no-fire impact test event at a given speed k=a selected bias factor for biasing the algorithm MAX denotes that BSM is the maximum value achieved by the bracketed quantity.

3. The method as defined by claim 1 wherein:

said predetermined time duration is the time required for the first stage of deployment of the airbag.

4. The method as defined by claim 2 wherein:

the step of calculating said predicted occupant movement which will occur during the event time plus a predetermined time duration in accordance with the expression:

$$POM = S_{sdm} + V_{sdm} t_d + \tfrac{1}{2} a_d t_d^2$$

where $S_{sdm}$ and $V_{sdm}$ denote the vehicle displacement and the vehicle velocity change at event time t, respectively, and where td denotes a desired time duration and $a_d$ denotes average acceleration obtained from averaging a finite duration of measured accelerations prior to the event time t.

5. The method as defined by claim 4 including the step of:

requiring the predicted occupant movement to exceed the predetermined movement threshold more than once before determining whether the biased severity measure is equal to or greater than the predetermined severity threshold.

* * * * *